(12) United States Patent
Lane et al.

(10) Patent No.: US 11,733,647 B2
(45) Date of Patent: Aug. 22, 2023

(54) LIGHT-ACTIVATED CONTROLLED RADICAL POLYMERIZATION

(71) Applicant: Meta Platforms Technologies, LLC, Menlo Park, CA (US)

(72) Inventors: Austin Lane, Sammamish, WA (US); Matthew E. Colburn, Woodinville, WA (US)

(73) Assignee: META PLATFORMS TECHNOLOGIES, LLC, Menlo Park, CA (US)

(*) Notice: Subject to any disclaimer, the term of this patent is extended or adjusted under 35 U.S.C. 154(b) by 0 days.

(21) Appl. No.: 16/840,124

(22) Filed: Apr. 3, 2020

(65) Prior Publication Data

US 2020/0356049 A1 Nov. 12, 2020

Related U.S. Application Data

(60) Provisional application No. 62/845,216, filed on May 8, 2019.

(51) Int. Cl.
*G03H 1/02* (2006.01)
*C08L 75/04* (2006.01)
(Continued)

(52) U.S. Cl.
CPC ........... *G03H 1/02* (2013.01); *C08F 2/48* (2013.01); *C08F 20/18* (2013.01); *C08L 75/04* (2013.01);
(Continued)

(58) Field of Classification Search
None
See application file for complete search history.

(56) References Cited

U.S. PATENT DOCUMENTS 4,659,648 A * 4/1987 Tise .................. G03F 7/0755
430/18
4,942,102 A * 7/1990 Keys .................. G03H 1/24
430/1

(Continued)

FOREIGN PATENT DOCUMENTS

| JP | H04188141 | | 7/1992 |
| JP | 2006-078821 | * | 3/2006 |
| JP | 2017-025150 | * | 2/2017 |

OTHER PUBLICATIONS

Machine trtanslatino of JP 2006-078821 (2006).*
(Continued)

*Primary Examiner* — Martin J Angebranndt
(74) *Attorney, Agent, or Firm* — Weaver Austin Villeneuve & Sampson LLP

(57) ABSTRACT

Techniques disclosed herein relate to holographic optical materials and elements. An example of a holographic recording material includes matrix monomers characterized by a first refractive index and configured to polymerize to form a polymer matrix, writing monomers dispersed in the matrix monomers and characterized by a second refractive index different from the first refractive index, and a photocatalyst for controlled radical polymerization of the writing monomers. The writing monomers are configured to polymerize upon exposed to recording light. The photocatalyst is dispersed in the matrix monomers. The photocatalyst includes, for example, a transition metal photocatalyst or a metal-free organic photocatalyst, such as a photocatalyst for atom transfer radical polymerization or a transition metal photocatalyst for addition fragmentation chain transfer polymerization.

14 Claims, 19 Drawing Sheets

(51) Int. Cl.
*C08F 2/48* (2006.01)
*C08F 20/18* (2006.01)

(52) U.S. Cl.
CPC ...... *C08F 2438/01* (2013.01); *C08F 2438/03* (2013.01); *G03H 2001/0264* (2013.01)

(56) References Cited

U.S. PATENT DOCUMENTS

| | | | | |
|---|---|---|---|---|
| 5,231,440 | A * | 7/1993 | Yamagishi | G03H 1/18 |
| | | | | 396/617 |
| 5,763,548 | A * | 6/1998 | Matyjaszewski | C09D 151/003 |
| | | | | 526/135 |
| 6,589,650 | B1 * | 7/2003 | Govek | C08L 53/00 |
| | | | | 428/355 AC |
| 6,660,457 | B1 * | 12/2003 | Imai | G03F 7/40 |
| | | | | 430/311 |
| 2003/0091733 | A1 * | 5/2003 | Galstian | C09K 19/544 |
| | | | | 427/162 |
| 2004/0245432 | A1 * | 12/2004 | Takizawa | H01L 27/14643 |
| | | | | 250/208.1 |
| 2005/0221198 | A1 * | 10/2005 | Takizawa | G11B 7/0065 |
| | | | | 430/1 |
| 2006/0057467 | A1 * | 3/2006 | Takizawa | G03F 7/001 |
| | | | | 430/1 |
| 2006/0194120 | A1 | 8/2006 | Cole et al. | |
| 2006/0194122 | A1 * | 8/2006 | Takizawa | G03F 7/001 |
| | | | | 430/1 |
| 2007/0148600 | A1 * | 6/2007 | Hasegawa | G03F 7/0388 |
| | | | | 430/311 |
| 2007/0231744 | A1 * | 10/2007 | Sasao | G03F 7/032 |
| | | | | 430/281.1 |
| 2009/0087753 | A1 * | 4/2009 | Satou | G03H 1/02 |
| | | | | 430/2 |
| 2011/0117477 | A1 * | 5/2011 | Pareek | G03F 7/027 |
| | | | | 430/2 |
| 2017/0029559 | A1 * | 2/2017 | Lu | C09D 133/066 |
| 2017/0088724 | A1 * | 3/2017 | Cappelle | C09D 125/08 |
| 2018/0237550 | A1 * | 8/2018 | Miyake | C08F 2/50 |
| 2020/0354311 | A1 * | 11/2020 | Lane | G03H 1/0248 |
| 2020/0354496 | A1 * | 11/2020 | Lane | G02B 5/18 |
| 2020/0354594 | A1 * | 11/2020 | Lane | G11B 7/245 |
| 2020/0355997 | A1 * | 11/2020 | Lane | C08F 22/24 |

OTHER PUBLICATIONS

Pan et al.. Mechanisms of photoinduced metal-free atom transfer radical polymerization: Experimental and computational studies, JACS 138 pp. 2411-2425 (Jan. 2016).*
Machine translation of JP 2017-025150 (2017).*
Shanmugam et al., "Photocontrolled living polymerization systems with reversible deactivations through electron and energy transfer", Macromol. Rapid Commun., vol. 38, article 1700143 (40 pages) (2017).*
Petrushenko et al., "Electron transfer in the photochremical reactions of phenothiazine with halomethanes", Russ. Chem. Bull., vol. 50(5) pp. 798-804 (May 2001).*
International Application No. PCT/US2020/031352, International Search Report and Written Opinion dated Sep. 25, 2020, 11 pages.
Konkolewicz, et al. "Visible Light and Sunlight Photoinduced ATRP with ppm of Cu Catalyst", ACS Macro Lett. 2012, 1, 10, 1219-1223,.
Liu, et al. "Metal-free photoinduced electron transfer-atom transfer radical polymerization (PET-ATRP) via a visible light organic photocatalyst", Polym. Chem., 2016, 7, 689-700.
Shamnugam, et al., "Photoinduced Electron Transfer-Reversible Addition-Fragmentation Chain Transfer (PET-RAFT) Polymerization of Vinyl Acetate and N-Vinylpyrrolidinone: Kinetic and Oxygen Tolerance Study", Macromolecules 2014, 47, 15, 4930-4942.
Theriot, et al., "Organocatalyzed atom transfer radical polymerization driven by visible light", Science May 27, 2016, vol. 352, Issue 6289, pp. 1082-1086.
Treat, et al. "Metal-Free Atom Transfer Radical Polymerization", J. Am. Chem. Soc. 2014, 136, 45, 16096-16101.
Xiao, et al, "Visible light sensitive photo initiating systems: Recent progress in cationic and radical photopolymerization reactions under soft conditions", Progress in Polymer Science, vol. 41, Sep. 1, 2014 (Sep. 1, 2014), pp. 32-66, XP029189792.
Zhang, et al. "ATRP with a light switch: photoinduced ATRP using a household fluorescent lamp", Polym, Chem., 2014, 5, 4790-4796.

* cited by examiner

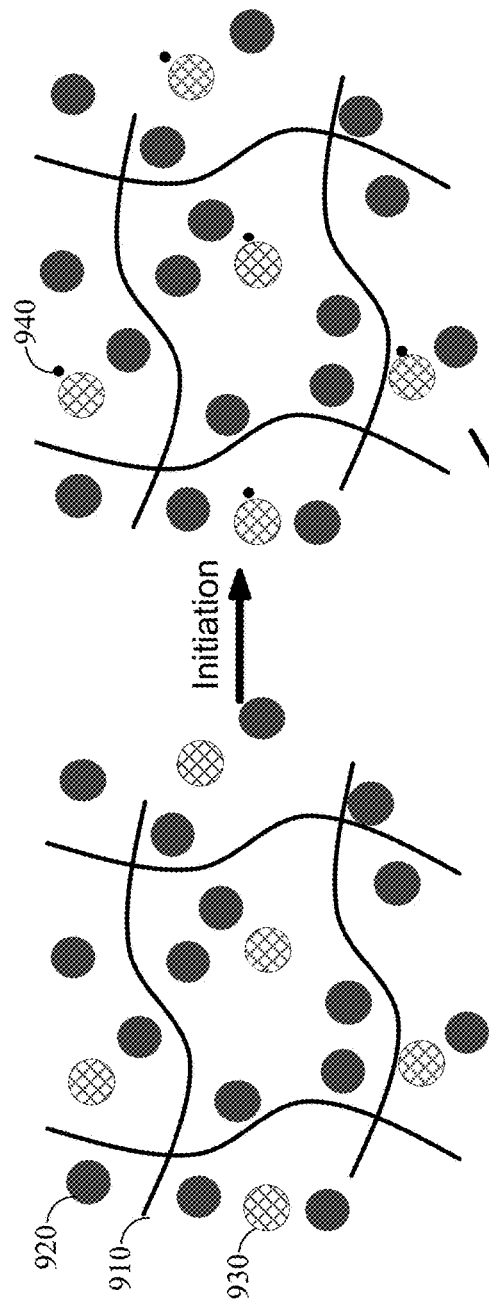
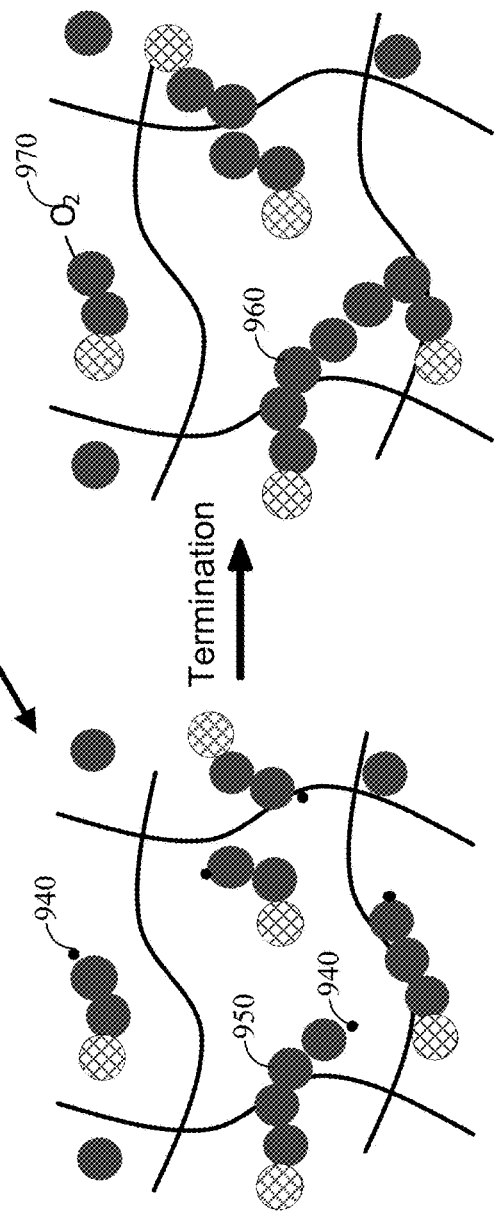
FIG. 9A  FIG. 9B  FIG. 9C  FIG. 9D

LIGHT-ACTIVATED CONTROLLED RADICAL POLYMERIZATION

CROSS-REFERENCE IN NON-PROVISIONAL CONVERSION

This patent application claims benefit of and priority to U.S. Provisional Patent Application Ser. No. 62/845,216, filed May 8, 2019, entitled "Light-Activated Controlled Radical Polymerization," which is assigned to the assignee hereof and is hereby incorporated by reference in its entirety for all purposes.

BACKGROUND

An artificial reality system, such as a head-mounted display (HMD) or heads-up display (HUD) system, generally includes a near-eye display system in the form of a headset or a pair of glasses and configured to present content to a user via an electronic or optic display within, for example, about 10-20 mm in front of the user's eyes. The near-eye display system may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through).

One example of an optical see-through AR system may use a waveguide-based optical display, where light of projected images may be coupled into a waveguide (e.g., a transparent substrate), propagate within the waveguide, and be coupled out of the waveguide at different locations. In some implementations, the light of the projected images may be coupled into or out of the waveguide using a diffractive optical element, such as a holographic grating. In some implementations, the artificial reality systems may employ eye-tracking subsystems that can track the user's eye (e.g., gaze direction) to modify or generate content based on the direction in which the user is looking, thereby providing a more immersive experience for the user. The eye-tracking subsystems may be implemented using various optical components, such as holographic optical elements.

SUMMARY

This disclosure relates generally to holographic optical elements. According to certain embodiments, a holographic optical element may include a polymer matrix including a first polymer material characterized by a first refractive index, a second polymer material supported by the polymer matrix and characterized by a second refractive index different from the first refractive index, and a photocatalyst for controlled radical polymerization. The photocatalyst may be dispersed in the polymer matrix. The second polymer material may be distributed in the polymer matrix according to a non-uniform pattern. In some embodiments, the photocatalyst may be sensitive to visible light and may be configured to generate a radical for polymerization upon exposure to the visible light. In some embodiments, the photocatalyst may be configured to, upon exposure to the visible light, generate a deactivating catalyst for deactivating the radical. In some embodiments, the photocatalyst may include a transition metal photocatalyst or a metal-free organic photocatalyst.

In some embodiments, the photocatalyst may include a photocatalyst for atom transfer radical polymerization (ATRP). For example, the photocatalyst may include a derivative of phenothiazine, aromatic hydrocarbon, phenazine, phenoxazine, carbazole, thienothiophene, or perylene. One example of the photocatalyst may include 10-phenylphenothiazine. In some embodiments, the second polymer material may include an organic halide.

In some embodiments, the photocatalyst may include a transition metal photocatalyst for addition fragmentation chain transfer (RAFT) polymerization, such as fac-Ir(ppy)$_3$ or Ru(bpy)$_3$Cl$_2$. In some embodiments, the holographic optical element may also include a RAFT agent. In some embodiments, the second polymer material includes a thiocarbonylthio compound.

In some embodiments, the first polymer material may include polyurethane. In some embodiments, a dispersity of the second polymer material may be less than 2. In some embodiments, the second polymer material distributed in the polymer matrix according to the non-uniform pattern may form a hologram, a holographic Bragg grating, a multiplexed holographic grating, a holographic lens, or a holographic diffuser.

According to some embodiments, an optical recording film may include a first substrate, a second substrate, a polymer matrix between the first substrate and the second substrate and characterized by a first refractive index; monomers dispersed in the polymer matrix and characterized by a second refractive index different from the first refractive index, and a photocatalyst for controlled radical polymerization of the monomers. The photocatalyst may be dispersed in the polymer matrix. The monomers may be configured to polymerize in regions of the optical recording film exposed to recording light. In some embodiments, the polymer matrix may include polyurethane. In some embodiments, the monomers may include acrylates, acrylamides, acrylonitrile, styrenes, dienes, or vinyl monomers.

In some embodiments, the photocatalyst may be sensitive to visible light and may be configured to generate a radical for polymerizing the monomers upon exposure to the visible light. In some embodiments, the photocatalyst may be configured to, upon exposure to the visible light, generate a deactivating catalyst for deactivating the radical. In some embodiments, the photocatalyst may include a transition metal photocatalyst or a metal-free organic photocatalyst.

In some embodiments, the photocatalyst may include a photocatalyst for atom transfer radical polymerization. For example, the photocatalyst may include a derivative of phenothiazine, aromatic hydrocarbon, phenazine, phenoxazine, carbazole, thienothiophene, or perylene. One example of the photocatalyst may include 10-phenylphenothiazine. In some embodiments, the optical recording film may further include an alkyl halide.

In some embodiments, the photocatalyst may include a transition metal photocatalyst for addition fragmentation chain transfer polymerization, such as fac-Ir(ppy)$_3$ or Ru(bpy)$_3$Cl$_2$. In some embodiments, the optical recording film may also include a RAFT agent. In some embodiments, the optical recording film may include a thiocarbonylthio compound configured to function as a chain transfer agent.

According to certain embodiments, an optical recording material may include a matrix monomers characterized by a first refractive index and configured to polymerize to form a polymer matrix, writing monomers dispersed in the matrix monomers and characterized by a second refractive index different from the first refractive index, and a photocatalyst for controlled radical polymerization of the writing monomers. The photocatalyst may be dispersed in the matrix monomers. The writing monomers may be configured to polymerize upon exposed to recording light. In some embodiments, the photocatalyst may be sensitive to visible light and may be configured to generate a radical for polymerizing the writing monomers upon exposure to the visible light. In some embodiments, the photocatalyst may be configured to, upon exposure to the visible light, generate a deactivating catalyst for deactivating the radical.

According to certain embodiments, a method of fabricating a holographic optical element may include forming a holographic material layer on a substrate, and exposing the holographic material layer to the recording light, where the recording light may be characterized by a non-uniform intensity pattern. The holographic material layer may include a polymer matrix characterized by a first refractive index, and monomers dispersed in the polymer matrix and characterized by a second refractive index different from the first refractive index, where the monomers may be configured to polymerize in regions of the holographic material layer exposed to recording light. The holographic material layer may also include a photocatalyst for controlled radical polymerization, where the photocatalyst may be dispersed in the polymer matrix. In some embodiments, forming the holographic material layer on the substrate may include laminating the holographic material layer on the substrate. In some embodiments, forming the holographic material layer on the substrate may include depositing a layer of an optical recording material on the substrate. The optical recording material may include matrix monomers configured to polymerize to form the polymer matrix, the writing monomers dispersed in the matrix monomers, and the photocatalyst dispersed in the matrix monomers. The optical recording material may be cured to polymerize the matrix monomers.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIGS. 9A-9D illustrate an example of free radical polymerization in an example of a photopolymer material. FIG. 9A illustrates the photopolymer material before polymerization. FIG. 9B illustrates the initiation of monomer chains. FIG. 9C illustrates the propagation of the monomer chains. FIG. 9D illustrates the termination of the monomer chains.

FIG. 10A illustrates the unexposed photopolymer material layer. FIG. 10B illustrates monomer diffusion and polymerization during the holographic recording. FIG. 10C illustrates an example of polymer diffusion after the exposure.

Figure 1:
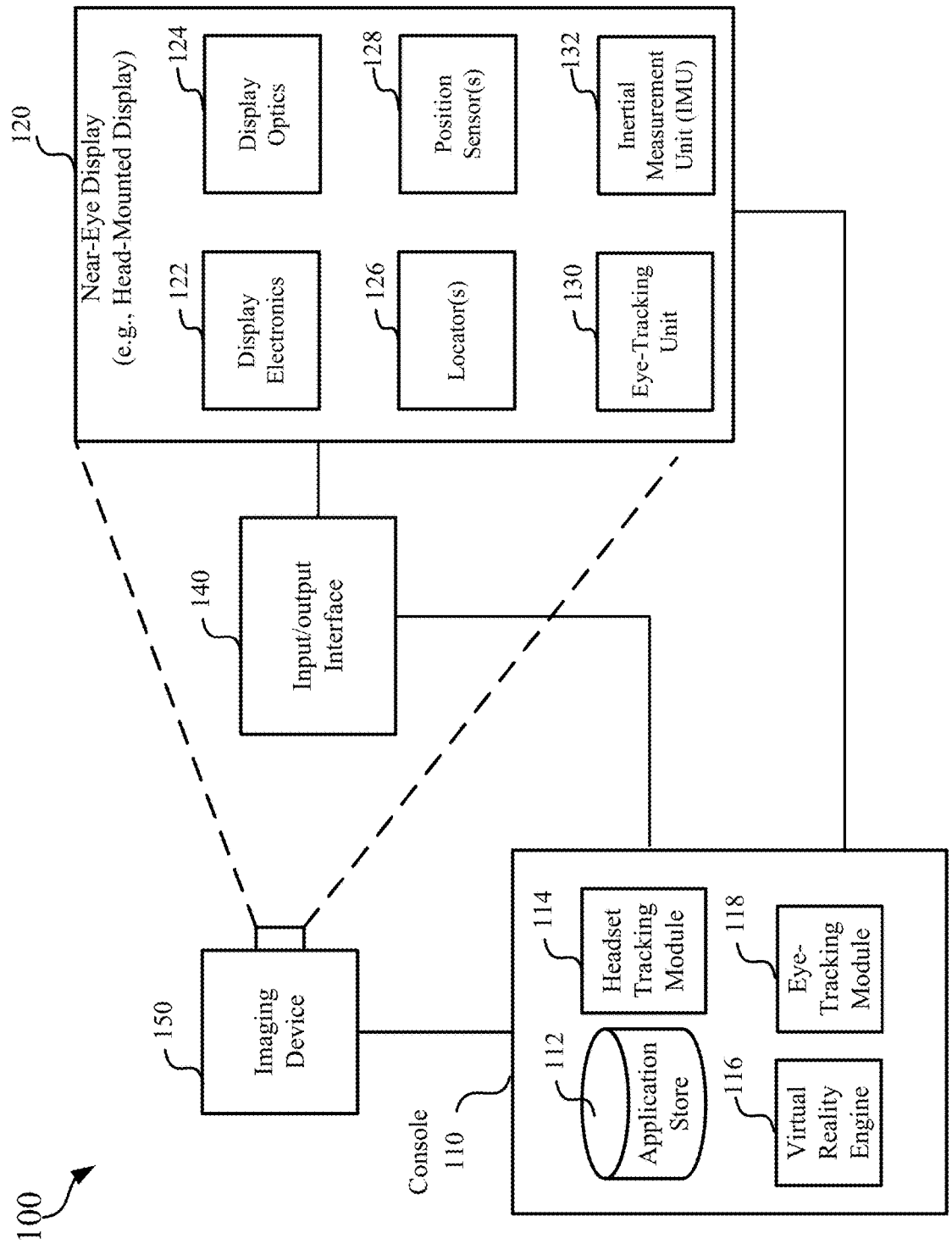
FIG. 1 is a simplified block diagram of an example of an artificial reality system environment including a near-eye display system according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques disclosed herein relate generally to holographic optical elements. More specifically, and without limitation, this disclosure relates to light-activated controlled radical polymerization holographic recording materials and holographic optical elements fabricated therein. Various inventive embodiments are described herein, including materials, systems, modules, devices, components, methods, compositions, and the like.

In various optical systems, such as artificial reality systems including virtual reality, augmented reality (AR), and mixed reality (MR) systems, to improve the performance of the optical systems, such as improving the brightness of the displayed images, expanding the eyebox, reducing artifacts, increasing the field of view, and improving user interaction with presented content, various holographic optical elements may be used for light beam coupling and shaping, such as coupling light into or out of a waveguide display or tracking the motion of the user's eyes. These holographic optical elements may need to have a high refractive index modulation, a small pitch or feature size, high clarity, high diffraction efficiency, and the like. However, in some holographic recording materials, such as some photopolymer materials, the polymerization of monomers during and after the recording may not be temporally and spatially controlled. Thus, the polymerization may generate polymers with relatively broad molecular weight distribution (high dispersity) and limited control over the polymer architecture and end group functionality. The polymerization may continue after the exposure and the polymers formed by the polymerization may diffuse to unexposed regions, which may reduce the achievable dynamic range, the minimum feature size, the achievable number of multiplexed gratings, the desired diffraction efficiency, and other performance of the holographic optical elements.

According to certain embodiments, light-activated controlled radical polymerization (CRP) photopolymer materials that are sensitive to light (e.g., visible or UV light), have high achievable dynamic ranges, and have both spatially and temporally controllable reaction and/or diffusion of the monomers are disclosed. The light-activated CRP photopolymer materials may include photocatalysts for generating radicals at room temperature upon exposure to light, where the concentration of radicals generated during the exposure may be low and the chain transfer may be suppressed during the polymerization. Thus, the radicals may be deactivated once the exposure stops and may be reactivated upon exposure. As a result, the reaction and/or diffusion of the monomers in the light-activated CRP photopolymer materials may only spatially occur in the exposed regions and may only temporally occur during the exposure time period. Therefore, the polymerization may be spatially and temporally controlled by the exposure light to fabricate holographic optical elements having desired refractive index modulation, frequency response, diffraction efficiencies, and the like.

As used herein, visible light may refer to light with a wavelength between about 380 nm and about 750 nm, between about 400 nm and about 700 nm, or between about 440 nm and about 650 nm. Near infrared (NIR) light may refer to light with a wavelength between about 750 nm to about 2500 nm. The desired infrared (IR) wavelength range may refer to the wavelength range of IR light that can be detected by a suitable IR sensor (e.g., a complementary metal-oxide semiconductor (CMOS), a charge-coupled device (CCD) sensor, or an InGaAs sensor), such as between 830 nm and 860 nm, between 930 nm and 980 nm, or between about 750 nm to about 1000 nm.

As also used herein, a substrate may refer to a medium within which light may propagate. The substrate may include one or more types of dielectric materials, such as glass, quartz, plastic, polymer, poly(methyl methacrylate) (PMMA), crystal, or ceramic. At least one type of material of the substrate may be transparent to visible light and NIR light. A thickness of the substrate may range from, for example, less than about 1 mm to about 10 mm or more. As used herein, a material may be "transparent" to a light beam if the light beam can pass through the material with a high transmission rate, such as larger than 60%, 75%, 80%, 90%, 95%, 98%, 99%, or higher, where a small portion of the light beam (e.g., less than 40%, 25%, 20%, 10%, 5%, 2%, 1%, or less) may be scattered, reflected, or absorbed by the material. The transmission rate (i.e., transmissivity) may be represented by either a photopically weighted or an unweighted average transmission rate over a range of wavelengths, or the lowest transmission rate over a range of wavelengths, such as the visible wavelength range.

As also used herein, the term "support matrix" refers to the material, medium, substance, etc., in which the polymerizable component is dissolved, dispersed, embedded, enclosed, etc. In some embodiments, the support matrix is typically a low $T_g$ polymer. The polymer may be organic, inorganic, or a mixture of the two. Without being particularly limited, the polymer may be a thermoset or thermoplastic.

As also used herein, the term "free radical polymerization" refers to any polymerization reaction that is initiated by any molecule comprising a free radical or radicals.

As also used herein, the term "cationic polymerization" refers to any polymerization reaction that is initiated by any molecule comprising a cationic moiety or moieties.

As also used herein, the term "anionic polymerization" refers to any polymerization reaction that is initiated by any molecule comprising an anionic moiety or moieties.

As also used herein, the term "photoinitiator" refers to the conventional meaning of the term photoinitiator and also refers to sensitizers and dyes. In general, a photoinitiator causes the light initiated polymerization of a material, such as a photoactive oligomer or monomer, when the material containing the photoinitiator is exposed to light of a wavelength that activates the photoinitiator, e.g., a photoinitiating light source. The photoinitiator may refer to a combination of components, some of which individually are not light sensitive, yet in combination are capable of curing the photoactive oligomer or monomer, examples of which include a dye/amine, a sensitizer/iodonium salt, a dye/borate salt, and the like.

As also used herein, the term "polymerizable component" refers to one or more photoactive polymerizable materials, and possibly one or more additional polymerizable materials, e.g., monomers and/or oligomers, that are capable of forming a polymer.

As also used herein, the term "photoactive polymerizable material" refers to a monomer, an oligomer and combinations thereof that polymerize in the presence of a photoinitiator that has been activated by being exposed to a photoinitiating light source, e.g., recording light. In reference to the functional group that undergoes curing, the photoactive polymerizable material comprises at least one such functional group. It is also understood that there exist photoactive polymerizable materials that are also photoinitiators, such as N-methylmaleimide, derivatized acetophenones, etc., and that in such a case, it is understood that the photoactive monomer and/or oligomer of the present disclosure may also be a photoinitiator.

As also used herein, the term "photopolymer" refers to a polymer formed by one or more photoactive polymerizable materials, and possibly one or more additional monomers and/or oligomers.

As also used herein, the term "polymerization inhibitor" refers to one or more compositions, compounds, molecules, etc., that are capable of inhibiting or substantially inhibiting the polymerization of the polymerizable component when the photoinitiating light source is on or off. Polymerization inhibitors typically react very quickly with radicals and effectively stop a polymerization reaction. Inhibitors cause an inhibition time during which little to no photopolymer forms, e.g., only very small chains. Typically, photopolymerization occurs only after nearly 100% of the inhibitor is reacted.

As also used herein, the term "chain transfer agent" refers to one or more compositions, compounds, molecules, etc. that are capable of interrupting the growth of a polymeric molecular chain by formation of a new radical that may react as a new nucleus for forming a new polymeric molecular chain. Typically, chain transfer agents cause the formation of a higher proportion of shorter polymer chains, relative to polymerization reactions that occur in the absence of chain transfer agents. In some embodiments, certain chain transfer agents can behave as retarders or inhibitors if they do not efficiently reinitiate polymerization.

As also used herein, the terms "photo-acid generators," "photo-base generators," and "photogenerated radicals," refer to one or more compositions, compounds, molecules, etc., that, when exposed to a light source, generate one or more compositions, compounds, molecules, etc., that are acidic, basic, or a free radical.

As also used herein, the term "alkyl" refers to a straight or branched hydrocarbon chain radical consisting solely of carbon and hydrogen atoms, containing no unsaturation, having from one to ten carbon atoms (e.g., $(C_{1-10})$alkyl or $C_{1-10}$alkyl). Whenever it appears herein, a numerical range such as "1 to 10" refers to each integer in the given range—e.g., "1 to 10 carbon atoms" means that the alkyl group may consist of 1 carbon atom, 2 carbon atoms, 3 carbon atoms, etc., up to and including 10 carbon atoms, although the definition is also intended to cover the occurrence of the term "alkyl" where no numerical range is specifically designated. Typical alkyl groups include, but are in no way limited to, methyl, ethyl, propyl, isopropyl, n-butyl, isobutyl, sec-butyl isobutyl, tertiary butyl, pentyl, isopentyl, neopentyl, hexyl, septyl, octyl, nonyl and decyl. The alkyl moiety may be attached to the rest of the molecule by a single bond, such as for example, methyl (Me), ethyl (Et), n-propyl (Pr), 1-methylethyl (isopropyl), n-butyl, i-pentyl, 1,1-dimethylethyl (t-butyl) and 3-methylhexyl. Unless stated otherwise specifically in the specification, an alkyl group is optionally substituted by one or more of substituents which are independently heteroalkyl, alkenyl, alkynyl, cycloalkyl, heterocycloalkyl, aryl, arylalkyl, heteroaryl, heteroarylalkyl, hydroxy, halo, cyano, trifluoromethyl, trifluoromethoxy, nitro, trimethylsilanyl, —OR$^a$, —SR$^a$, —OC(O)—R$^a$, —N(R$^a$)$_2$, —C(O)R$^a$, —C(O)OR$^a$, —OC(O)N(R$^a$)$_2$, —C(O)N(R$^a$)$_2$, —N(R$^a$)C(O)OR$^a$, —N(R$^a$)C(O)R$^a$, —N(R)C(O)N(R$^a$)$_2$, N(R$^a$)C(NR$^a$) N(R$^a$)$_2$, —N(R$^a$)S(O)$_t$R$^a$ (where t is 1 or 2), —S(O)OR$^a$ (where t is 1 or 2), —S(O)$_t$N(R$^a$)$_2$ (where t is 1 or 2), —S(O)N(R$^a$)C(O)R$^a$(where t is 1 or 2), or PO$_3$(R$^a$)$_2$ where each R is independently hydrogen, fluoroalkyl, carbocyclyl, carbocyclylalkyl, aryl, aralkyl, heterocycloalkyl, heterocycloalkylalkyl, heteroaryl or heteroarylalkyl.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display system 120 in accordance with certain embodiments. Artificial reality system environment 100 shown in FIG. 1 may include near-eye display system 120, an optional imaging device 150, and an optional input/output interface 140 that may each be coupled to an optional console 110. While FIG. 1 shows example artificial reality system environment 100 including one near-eye display system 120, one imaging device 150, and one input/output interface 140, any number of these components may be included in artificial reality system environment 100, or any of the components may be omitted. For example, there may be multiple near-eye display systems 120 monitored by one or more external imaging devices 150 in communication with console 110. In some configurations, artificial reality system environment 100 may not include imaging device 150, optional input/output interface 140, and optional console 110. In alternative configurations, different or additional components may be included in artificial reality system environment 100. In some configurations, near-eye display systems 120 may include imaging device 150, which may be used to track one or more input/output devices (e.g., input/output interface 140), such as a handhold controller.

Near-eye display system 120 may be a head-mounted display that presents content to a user. Examples of content presented by near-eye display system 120 include one or more of images, videos, audios, or some combination thereof. In some embodiments, audios may be presented via an external device (e.g., speakers and/or headphones) that receives audio information from near-eye display system 120, console 110, or both, and presents audio data based on the audio information. Near-eye display system 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display system 120 may be implemented in any suitable form factor, including a pair of glasses. Some embodiments of near-eye display system 120 are further described below. Additionally, in various embodiments, the functionality described herein may be used in a headset that combines images of an environment external to near-eye display system 120 and artificial reality content (e.g., computer-generated images). Therefore, near-eye display system 120 may augment images of a physical, real-world environment external to near-eye display system 120 with generated content (e.g., images, video, sound, etc.) to present an augmented reality to a user.

In various embodiments, near-eye display system 120 may include one or more of display electronics 122, display optics 124, and an eye-tracking system 130. In some embodiments, near-eye display system 120 may also include one or more locators 126, one or more position sensors 128, and an inertial measurement unit (IMU) 132. Near-eye display system 120 may omit any of these elements or include additional elements in various embodiments. Additionally, in some embodiments, near-eye display system 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (μLED) display, an active-matrix OLED display (AMO-LED), a transparent OLED display (TOLED), or some other display. For example, in one implementation of near-eye display system 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereo effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers), magnify image light received from display electronics 122, correct optical errors associated with the image light, and present the corrected image light to a user of near-eye display system 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display system 120/

Display optics 124 may also be designed to correct one or more types of optical errors, such as two-dimensional optical errors, three-dimensional optical errors, or a combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display system 120 relative to one another and relative to a reference point on near-eye display system 120. In some implementations, console 110 may identify locators 126 in images captured by imaging device 150 to determine the artificial reality headset's position, orientation, or both. A locator 126 may be a light emitting diode (LED), a corner cube reflector, a reflective marker, a type of light source that contrasts with an environment in which near-eye display system 120 operates, or some combinations thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

Imaging device 150 may be part of near-eye display system 120 or may be external to near-eye display system 120. Imaging device 150 may generate slow calibration data based on calibration parameters received from console 110. Slow calibration data may include one or more images showing observed positions of locators 126 that are detectable by imaging device 150. Imaging device 150 may include one or more cameras, one or more video cameras, any other device capable of capturing images including one or more of locators 126, or some combinations thereof. Additionally, imaging device 150 may include one or more filters (e.g., to increase signal to noise ratio). Imaging device 150 may be configured to detect light emitted or reflected from locators 126 in a field of view of imaging device 150. In embodiments where locators 126 include passive elements (e.g., retroreflectors), imaging device 150 may include a light source that illuminates some or all of locators 126, which may retro-reflect the light to the light source in imaging device 150. Slow calibration data may be communicated from imaging device 150 to console 110, and imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display system 120. Examples of position sensors 128 may include accelerometers, gyroscopes, magnetometers, other motion-detecting or error-correcting sensors, or some combinations thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or some combination thereof. Based on the one or more measurement signals from one or more position sensors 128, IMU 132 may generate fast calibration data indicating an estimated position of near-eye display system 120 relative to an initial position of near-eye display system 120. For example, IMU 132 may integrate measurement signals received from accelerometers over time to estimate a velocity vector and integrate the velocity vector over time to determine an estimated position of a reference point on near-eye display system 120. Alternatively, IMU 132 may provide the sampled measurement signals to console 110, which may determine the fast calibration data. While the reference point may generally be defined as a point in space, in various embodiments, the reference point may also be defined as a point within near-eye display system 120 (e.g., a center of IMU 132).

Eye-tracking system 130 may include one or more eye-tracking systems. Eye tracking may refer to determining an eye's position, including orientation and location of the eye, relative to near-eye display system 120. An eye-tracking system may include an imaging system to image one or more eyes and may generally include a light emitter, which may generate light that is directed to an eye such that light reflected by the eye may be captured by the imaging system. For example, eye-tracking system 130 may include a non-coherent or coherent light source (e.g., a laser diode) emitting light in the visible spectrum or infrared spectrum, and a camera capturing the light reflected by the user's eye. As another example, eye-tracking system 130 may capture reflected radio waves emitted by a miniature radar unit. Eye-tracking system 130 may use low-power light emitters that emit light at frequencies and intensities that would not injure the eye or cause physical discomfort. Eye-tracking system 130 may be arranged to increase contrast in images of an eye captured by eye-tracking system 130 while reducing the overall power consumed by eye-tracking system 130 (e.g., reducing power consumed by a light emitter and an imaging system included in eye-tracking system 130). For example, in some implementations, eye-tracking system 130 may consume less than 100 milliwatts of power.

Eye-tracking system 130 may be configured to estimate the orientation of the user's eye. The orientation of the eye may correspond to the direction of the user's gaze within near-eye display system 120. The orientation of the user's eye may be defined as the direction of the foveal axis, which is the axis between the fovea (an area on the retina of the eye with the highest concentration of photoreceptors) and the center of the eye's pupil. In general, when a user's eyes are fixed on a point, the foveal axes of the user's eyes intersect that point. The pupillary axis of an eye may be defined as the axis that passes through the center of the pupil and is perpendicular to the corneal surface. In general, even though the pupillary axis and the foveal axis intersect at the center of the pupil, the pupillary axis may not directly align with the foveal axis. For example, the orientation of the foveal axis may be offset from the pupillary axis by approximately −1° to 8° laterally and about 4° vertically (which may be referred to as kappa angles, which may vary from person to person). Because the foveal axis is defined according to the fovea, which is located in the back of the eye, the foveal axis may be difficult or impossible to measure directly in some eye-tracking embodiments. Accordingly, in some embodiments, the orientation of the pupillary axis may be detected and the foveal axis may be estimated based on the detected pupillary axis.

In general, the movement of an eye corresponds not only to an angular rotation of the eye, but also to a translation of the eye, a change in the torsion of the eye, and/or a change in the shape of the eye. Eye-tracking system 130 may also be configured to detect the translation of the eye, which may be a change in the position of the eye relative to the eye socket. In some embodiments, the translation of the eye may not be detected directly, but may be approximated based on a mapping from a detected angular orientation. Translation of the eye corresponding to a change in the eye's position relative to the eye-tracking system due to, for example, a shift in the position of near-eye display system 120 on a user's head, may also be detected. Eye-tracking system 130 may also detect the torsion of the eye and the rotation of the eye about the pupillary axis. Eye-tracking system 130 may use the detected torsion of the eye to estimate the orientation of the foveal axis from the pupillary axis. In some embodiments, eye-tracking system 130 may also track a change in the shape of the eye, which may be approximated as a skew or scaling linear transform or a twisting distortion (e.g., due to torsional deformation). In some embodiments, eye-tracking system 130 may estimate the foveal axis based on some combinations of the angular orientation of the pupillary axis, the translation of the eye, the torsion of the eye, and the current shape of the eye.

In some embodiments, eye-tracking system 130 may include multiple emitters or at least one emitter that can project a structured light pattern on all portions or a portion of the eye. The structured light pattern may be distorted due to the shape of the eye when viewed from an offset angle. Eye-tracking system 130 may also include at least one camera that may detect the distortions (if any) of the structured light pattern projected onto the eye. The camera may be oriented on a different axis to the eye than the emitter. By detecting the deformation of the structured light pattern on the surface of the eye, eye-tracking system 130 may determine the shape of the portion of the eye being illuminated by the structured light pattern. Therefore, the captured distorted light pattern may be indicative of the 3D shape of the illuminated portion of the eye. The orientation of the eye may thus be derived from the 3D shape of the illuminated portion of the eye. Eye-tracking system 130 can also estimate the pupillary axis, the translation of the eye, the torsion of the eye, and the current shape of the eye based on the image of the distorted structured light pattern captured by the camera.

Near-eye display system 120 may use the orientation of the eye to, e.g., determine an inter-pupillary distance (IPD) of the user, determine gaze directions, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or some combination thereof. Because the orientation may be determined for both eyes of the user, eye-tracking system 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140. In some embodiments, imaging device 150 may be used to track input/output interface 140, such as tracking the location or position of a controller (which may include, for example, an IR light source) or a hand of the user to determine the motion of the user. In some embodiments, near-eye display 120 may include one or more imaging devices (e.g., imaging device 150) to track input/output interface 140, such as tracking the location or position of a controller or a hand of the user to determine the motion of the user.

Console 110 may provide content to near-eye display system 120 for presentation to the user in accordance with information received from one or more of imaging device 150, near-eye display system 120, and input/output interface 140. In the example shown in FIG. 1, console 110 may include an application store 112, a headset tracking module 114, an artificial reality engine 116, and eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display system 120 using slow calibration information from imaging device 150. For example, headset tracking module 114 may determine positions of a reference point of near-eye display system 120 using observed locators from the slow calibration information and a model of near-eye display system 120. Headset tracking module 114 may also determine positions of a reference point of near-eye display system 120 using position information from the fast calibration information. Additionally, in some embodiments, headset tracking module 114 may use portions of the fast calibration information, the slow calibration information, or some combination thereof, to predict a future location of near-eye display system 120. Headset tracking module 114 may provide the estimated or predicted future position of near-eye display system 120 to artificial reality engine 116.

Headset tracking module 114 may calibrate the artificial reality system environment 100 using one or more calibration parameters, and may adjust one or more calibration parameters to reduce errors in determining the position of near-eye display system 120. For example, headset tracking module 114 may adjust the focus of imaging device 150 to obtain a more accurate position for observed locators on near-eye display system 120. Moreover, calibration performed by headset tracking module 114 may also account for information received from IMU 132. Additionally, if tracking of near-eye display system 120 is lost (e.g., imaging device 150 loses line of sight of at least a threshold number of locators 126), headset tracking module 114 may re-calibrate some or all of the calibration parameters.

Artificial reality engine 116 may execute applications within artificial reality system environment 100 and receive position information of near-eye display system 120, acceleration information of near-eye display system 120, velocity information of near-eye display system 120, predicted future positions of near-eye display system 120, or some combination thereof from headset tracking module 114. Artificial reality engine 116 may also receive estimated eye position and orientation information from eye-tracking module 118. Based on the received information, artificial reality engine 116 may determine content to provide to near-eye display system 120 for presentation to the user. For example, if the received information indicates that the user has looked to the left, artificial reality engine 116 may generate content for near-eye display system 120 that reflects the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display system 120 or haptic feedback via input/output interface 140.

Eye-tracking module 118 may receive eye-tracking data from eye-tracking system 130 and determine the position of the user's eye based on the eye-tracking data. The position of the eye may include an eye's orientation, location, or both relative to near-eye display system 120 or any element thereof. Because the eye's axes of rotation change as a function of the eye's location in its socket, determining the eye's location in its socket may allow eye-tracking module 118 to more accurately determine the eye's orientation.

In some embodiments, eye-tracking module 118 may store a mapping between images captured by eye-tracking system 130 and eye positions to determine a reference eye position from an image captured by eye-tracking system 130. Alternatively or additionally, eye-tracking module 118 may determine an updated eye position relative to a reference eye position by comparing an image from which the reference eye position is determined to an image from which the updated eye position is to be determined. Eye-tracking module 118 may determine eye position using measurements from different imaging devices or other sensors. For example, eye-tracking module 118 may use measurements from a slow eye-tracking system to determine a reference eye position, and then determine updated positions relative to the reference eye position from a fast eye-tracking system until a next reference eye position is determined based on measurements from the slow eye-tracking system.

Eye-tracking module 118 may also determine eye calibration parameters to improve precision and accuracy of eye tracking. Eye calibration parameters may include parameters that may change whenever a user dons or adjusts near-eye display system 120. Example eye calibration parameters may include an estimated distance between a component of eye-tracking system 130 and one or more parts of the eye, such as the eye's center, pupil, cornea boundary, or a point on the surface of the eye. Other example eye calibration parameters may be specific to a particular user and may include an estimated average eye radius, an average corneal radius, an average sclera radius, a map of features on the eye surface, and an estimated eye surface contour. In embodiments where light from the outside of near-eye display system 120 may reach the eye (as in some augmented reality applications), the calibration parameters may include correction factors for intensity and color balance due to variations in light from the outside of near-eye display system 120. Eye-tracking module 118 may use eye calibration parameters to determine whether the measurements captured by eye-tracking system 130 would allow eye-tracking module 118 to determine an accurate eye position (also referred to herein as "valid measurements"). Invalid measurements, from which eye-tracking module 118 may not be able to determine an accurate eye position, may be caused by the user blinking, adjusting the headset, or removing the headset, and/or may be caused by near-eye display system 120 experiencing greater than a threshold change in illumination due to external light. In some embodiments, at least some of the functions of eye-tracking module 118 may be performed by eye-tracking system 130.

Figure 2:
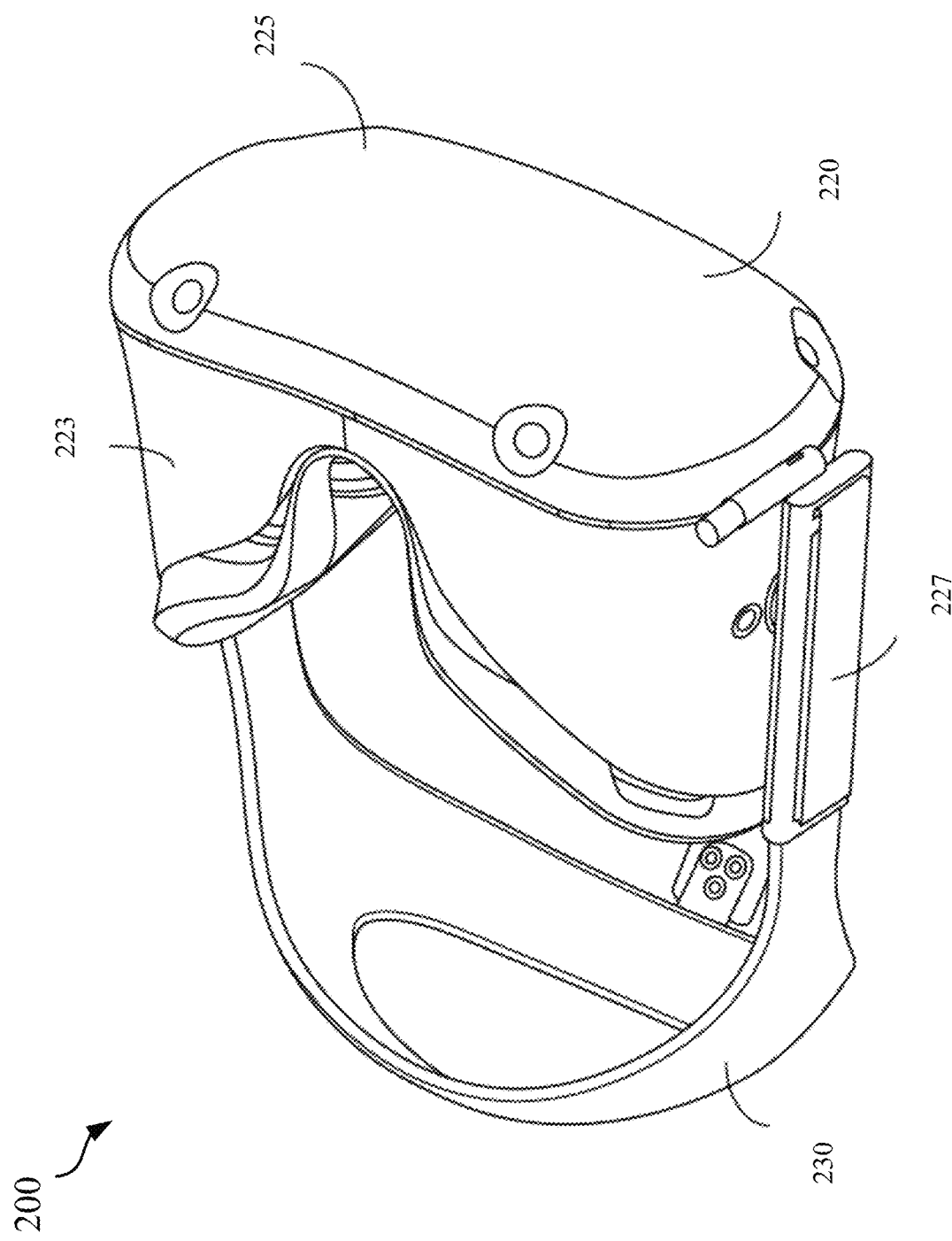
FIG. 2 is a perspective view of an example of a near-eye display system in the form of a head-mounted display (HMD) device for implementing some of the examples disclosed herein.

FIG. 2 is a perspective view of an example of a near-eye display system in the form of a head-mounted display (HMD) device 200 for implementing some of the examples disclosed herein. HMD device 200 may be a part of, e.g., a virtual reality (VR) system, an augmented reality (AR) system, a mixed reality (MR) system, or some combinations thereof. HMD device 200 may include a body 220 and a head strap 230. FIG. 2 shows a bottom side 223, a front side 225, and a left side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temples tips as shown in, for example, FIG. 2, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audios, or some combinations thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, a liquid crystal display (LCD), an organic light emitting diode (OLED) display, an inorganic light emitting diode (ILED) display, a micro light emitting diode (pLED) display, an active-matrix organic light emitting diode (AMOLED) display, a transparent organic light emitting diode (TOLED) display, some other display, or some combinations thereof. HMD device 200 may include two eye box regions.

In some implementations, HMD device 200 may include various sensors (not shown), such as depth sensors, motion sensors, position sensors, and eye-tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or some combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
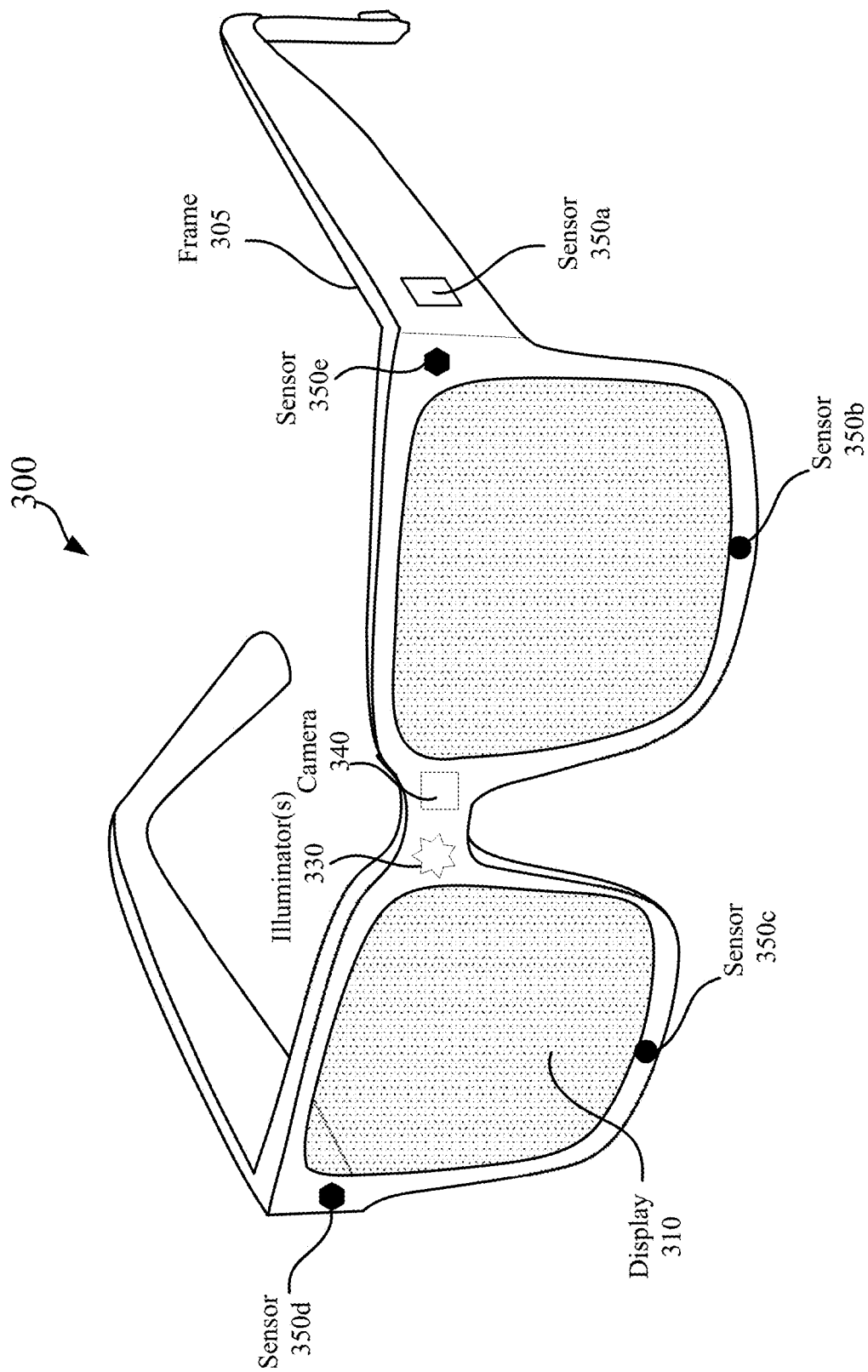
FIG. 3 is a perspective view of an example of a near-eye display system in the form of a pair of glasses for implementing some of the examples disclosed herein.

FIG. 3 is a perspective view of an example of a near-eye display system 300 in the form of a pair of glasses for implementing some of the examples disclosed herein. Near-eye display system 300 may be a specific implementation of near-eye display system 120 of FIG. 1, and may be configured to operate as a virtual reality display, an augmented reality display, and/or a mixed reality display. Near-eye display system 300 may include a frame 305 and a display 310. Display 310 may be configured to present content to a user. In some embodiments, display 310 may include display electronics and/or display optics. For example, as described above with respect to near-eye display system 120 of FIG. 1, display 310 may include an LCD display panel, an LED display panel, or an optical display panel (e.g., a waveguide display assembly).

Near-eye display system 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different fields of views in different directions. In some embodiments, sensors 350a-350e may be used as input devices to control or influence the displayed content of near-eye display system 300, and/or to provide an interactive VR/AR/MR experience to a user of near-eye display system 300. In some embodiments, sensors 350a-350e may also be used for stereoscopic imaging.

In some embodiments, near-eye display system 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light pattern onto the objects within the environment. In some embodiments, illuminator(s) 330 may be used as locators, such as locators 126 described above with respect to FIG. 1.

In some embodiments, near-eye display system 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
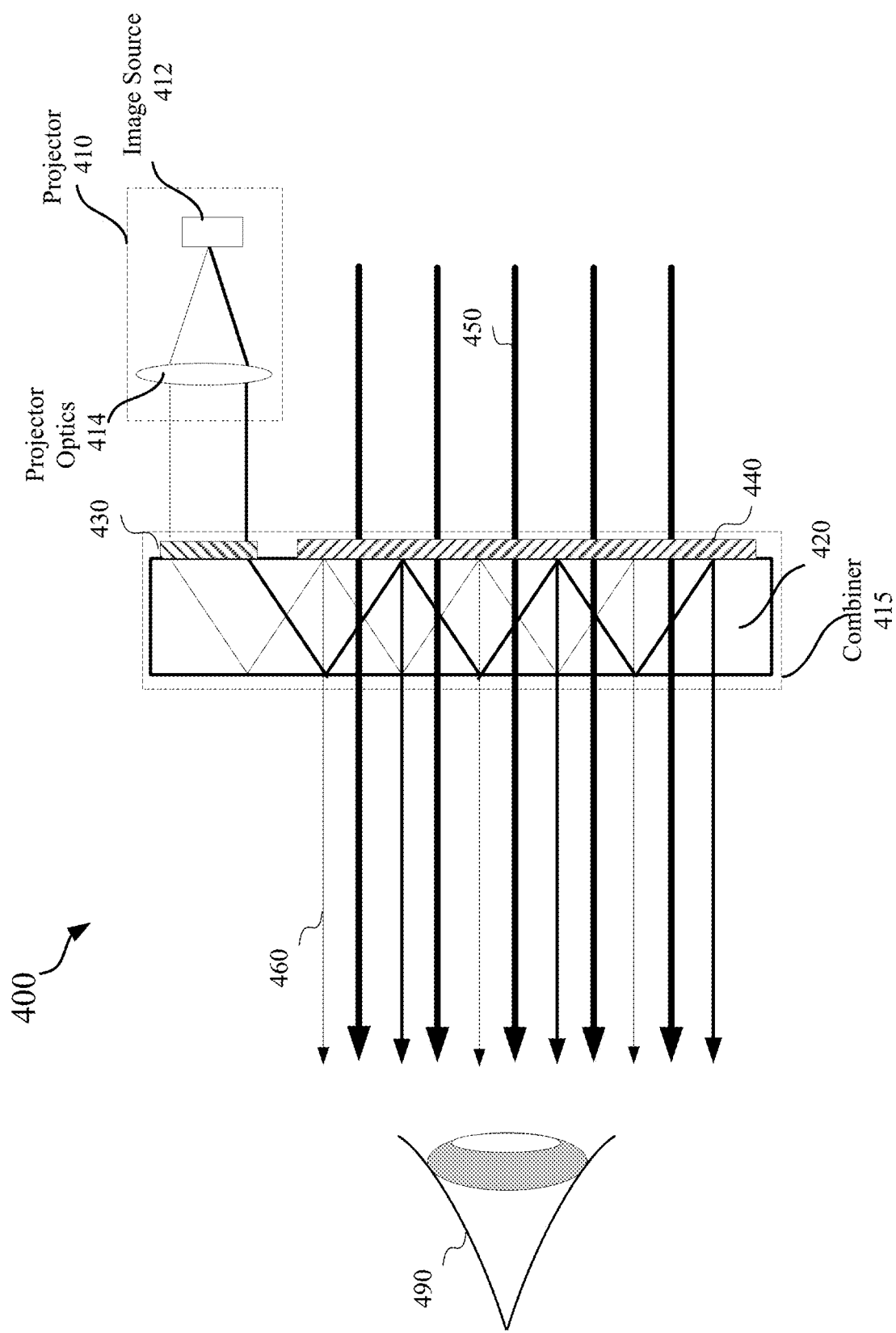
FIG. 4 illustrates an example of an optical see-through augmented reality system using a waveguide display that includes an optical combiner according to certain embodiments.

FIG. 4 illustrates an example of an optical see-through augmented reality system 400 using a waveguide display according to certain embodiments. Augmented reality system 400 may include a projector 410 and a combiner 415. Projector 410 may include a light source or image source 412 and projector optics 414. In some embodiments, image source 412 may include a plurality of pixels that displays virtual objects, such as an LCD display panel or an LED display panel. In some embodiments, image source 412 may include a light source that generates coherent or partially coherent light. For example, image source 412 may include a laser diode, a vertical cavity surface emitting laser, and/or a light emitting diode. In some embodiments, image source 412 may include a plurality of light sources each emitting a monochromatic image light corresponding to a primary color (e.g., red, green, or blue). In some embodiments, image source 412 may include an optical pattern generator, such as a spatial light modulator. Projector optics 414 may include one or more optical components that can condition the light from image source 412, such as expanding, collimating, scanning, or projecting light from image source 412 to combiner 415. The one or more optical components may include, for example, one or more lenses, liquid lenses, mirrors, apertures, and/or gratings. In some embodiments, projector optics 414 may include a liquid lens (e.g., a liquid crystal lens) with a plurality of electrodes that allows scanning of the light from image source 412.

Combiner 415 may include an input coupler 430 for coupling light from projector 410 into a substrate 420 of combiner 415. Combiner 415 may transmit at least 50% of light in a first wavelength range and reflect at least 25% of light in a second wavelength range. For example, the first wavelength range may be visible light from about 400 nm to about 650 nm, and the second wavelength range may be in the infrared band, for example, from about 800 nm to about 1000 nm. Input coupler 430 may include a volume holographic grating, a diffractive optical elements (DOE) (e.g., a surface-relief grating), a slanted surface of substrate 420, or a refractive coupler (e.g., a wedge or a prism). Input coupler 430 may have a coupling efficiency of greater than 30%, 50%, 75%, 90%, or higher for visible light. Light coupled into substrate 420 may propagate within substrate 420 through, for example, total internal reflection (TIR). Substrate 420 may be in the form of a lens of a pair of eyeglasses. Substrate 420 may have a flat or a curved surface, and may include one or more types of dielectric materials, such as glass, quartz, plastic, polymer, poly(methyl methacrylate) (PMMA), crystal, or ceramic. A thickness of the substrate may range from, for example, less than about 1 mm to about 10 mm or more. Substrate 420 may be transparent to visible light.

Substrate 420 may include or may be coupled to a plurality of output couplers 440 configured to extract at least a portion of the light guided by and propagating within substrate 420 from substrate 420, and direct extracted light 460 to an eye 490 of the user of augmented reality system 400. As input coupler 430, output couplers 440 may include grating couplers (e.g., volume holographic gratings or surface-relief gratings), other DOEs, prisms, etc. Output couplers 440 may have different coupling (e.g., diffraction) efficiencies at different locations. Substrate 420 may also allow light 450 from environment in front of combiner 415 to pass through with little or no loss. Output couplers 440 may also allow light 450 to pass through with little loss. For example, in some implementations, output couplers 440 may have a low diffraction efficiency for light 450 such that light 450 may be refracted or otherwise pass through output couplers 440 with little loss, and thus may have a higher intensity than extracted light 460. In some implementations, output couplers 440 may have a high diffraction efficiency for light 450 and may diffract light 450 to certain desired directions (i.e., diffraction angles) with little loss. As a result, the user may be able to view combined images of the environment in front of combiner 415 and virtual objects projected by projector 410.

In addition, as described above, in an artificial reality system, to improve user interaction with presented content, the artificial reality system may track the user's eye and modify or generate content based on a location or a direction in which the user is looking at. Tracking the eye may include tracking the position and/or shape of the pupil and/or the cornea of the eye, and determining the rotational position or gaze direction of the eye. One technique (referred to as Pupil Center Corneal Reflection or PCCR method) involves using NIR LEDs to produce glints on the eye cornea surface and then capturing images/videos of the eye region. Gaze direction can be estimated from the relative movement between the pupil center and glints. Various holographic optical elements may be used in an eye-tracking system for illuminating the user's eyes or collecting light reflected by the user's eye.

One example of the holographic optical elements used in an artificial reality system for eye tracking or image display may be a holographic volume Bragg grating, which may be recorded on a holographic material layer by exposing the holographic material layer to light patterns generated by the interference between two or more coherent light beams.

Figures 5A, 5B:
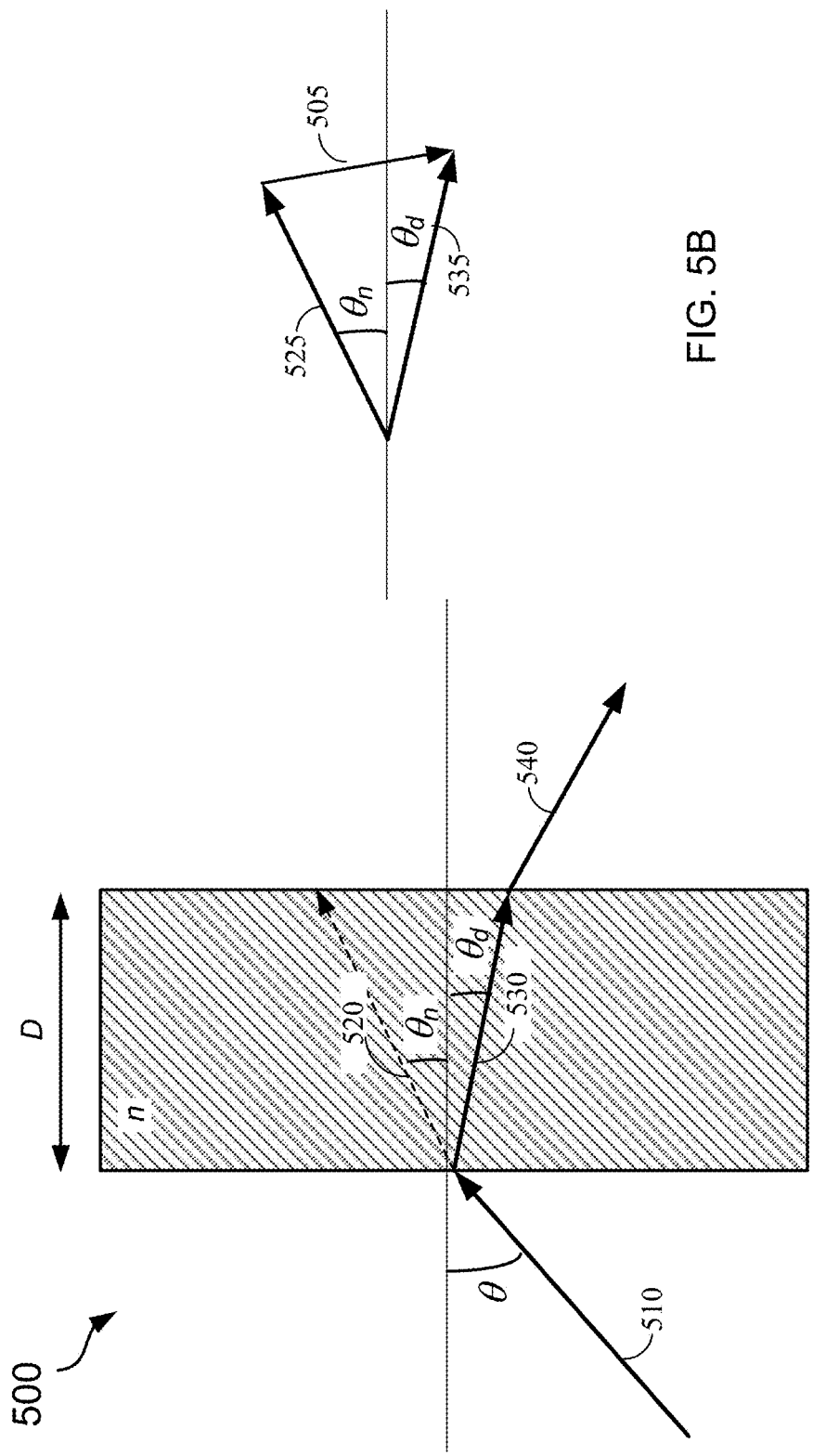
FIG. 5A illustrates an example of a volume Bragg grating (VBG).
FIG. 5B illustrates the Bragg condition for the volume Bragg grating shown in FIG. 5A.

FIG. 5A illustrates an example of a volume Bragg grating (VBG) 500. Volume Bragg grating 500 shown in FIG. 5A may include a transmission holographic grating that has a thickness D. The refractive index n of volume Bragg grating 500 may be modulated at an amplitude $n_1$, and the grating period of volume Bragg grating 500 may be $\Lambda$. Incident light 510 having a wavelength $\lambda$ may be incident on volume Bragg grating 500 at an incident angle $\theta$, and may be refracted into volume Bragg grating 500 as incident light 520 that propagates at an angle $\theta_n$ in volume Bragg grating 500. Incident light 520 may be diffracted by volume Bragg grating 500 into diffraction light 530, which may propagate at a diffraction angle $\theta_d$ in volume Bragg grating 500 and may be refracted out of volume Bragg grating 500 as diffraction light 540.

FIG. 5B illustrates the Bragg condition for volume Bragg grating 500 shown in FIG. 5A. Vector 505 represents the grating vector $\vec{G}$, where $|\vec{G}|=2\pi/\Lambda$. Vector 525 represents the incident wave vector $\vec{k}_I$, and vector 535 represents the diffract wave vector $\vec{k}_d$, where $|\vec{k}_I|=|\vec{k}_d|=2\pi n/\lambda$. Under the Bragg phase-matching condition, $\vec{k}_I-\vec{k}_d=\vec{G}$. Thus, for a given wavelength $\lambda$, there may only be one pair of incident angle $\theta$ (or $\theta_n$) and diffraction angle $\theta_d$ that meets the Bragg condition perfectly. Similarly, for a given incident angle $\theta$, there may only be one wavelength $\lambda$ that meets the Bragg condition perfectly. As such, the diffraction may only occur in a small wavelength range and a small incident angle range. The diffraction efficiency, the wavelength selectivity, and the angular selectivity of volume Bragg grating 500 may be functions of thickness D of volume Bragg grating 500. For example, the full-width-half-magnitude (FWHM) wavelength range and the FWHM angle range of volume Bragg grating 500 at the Bragg condition may be inversely proportional to thickness D of volume Bragg grating 500, while the maximum diffraction efficiency at the Bragg condition may be a function $\sin^2(a \times n_1 \times D)$, where a is a coefficient. For a reflection volume Bragg grating, the maximum diffraction efficiency at the Bragg condition may be a function of $\tanh^2(a \times n_1 \times D)$.

In some embodiments, a multiplexed Bragg grating may be used to achieve the desired optical performance, such as a high diffraction efficiency and a large FOV for the full visible spectrum (e.g., from about 400 nm to about 700 nm, or from about 440 nm to about 650 nm). Each part of the multiplexed Bragg grating may be used to diffract light from a respective FOV range and/or within a respective wavelength range. Thus, in some designs, multiple volume Bragg gratings each recorded under a respective recording condition may be used.

The holographic optical elements described above may be recorded in a holographic material (e.g., photopolymer) layer. In some embodiments, the HOEs can be recorded first and then laminated on a substrate in a near-eye display system. In some embodiments, a holographic material layer may be coated or laminated on the substrate and the HOEs may then be recorded in the holographic material layer.

In general, to record a holographic optical element in a photosensitive material layer, two coherent beams may interfere with each other at certain angles to generate a unique interference pattern in the photosensitive material layer, which may in turn generate a unique refractive index modulation pattern in the photosensitive material layer, where the refractive index modulation pattern may correspond to the light intensity pattern of the interference pattern. The photosensitive material layer may include, for example, silver halide emulsion, dichromated gelatin, photopolymers including photo-polymerizable monomers suspended in a polymer matrix, photorefractive crystals, and the like. One example of the photosensitive material layer for holographic recording is two-stage photopolymers.

Figure 6:
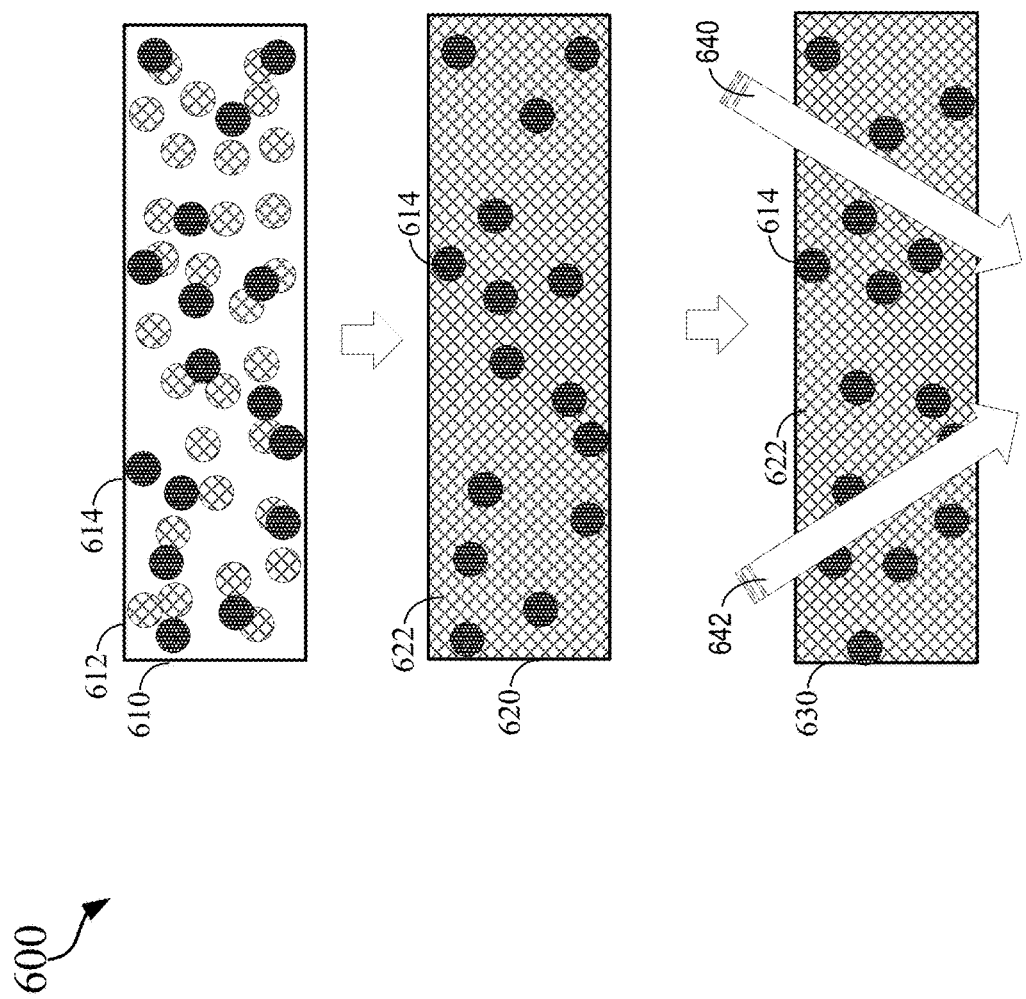
FIG. 6 illustrates an example of a holographic recording material including two-stage photopolymers.

FIG. 6 illustrates an example of a holographic recording material including two-stage photopolymers. The raw material 610 of the two-stage photopolymers may be a resin including matrix precursors 612 and imaging components 614. Matrix precursors 612 in raw material 610 may include monomers that may be thermally or otherwise cured at the first stage to polymerize and to form a photopolymer film 620 that includes a cross-linked matrix formed by polymeric binders 622. Imaging components 614 may include writing monomers and polymerization initiating agents, such as photosensitizing dyes, initiators, and/or chain transfer agents. Thus, photopolymer film 620 may include polymeric binders 622, writing monomers (e.g., acrylate monomers), and initiating agents, such as photosensitizing dyes, initiators, and/or chain transfer agents. Polymeric binders 622 may act as the backbone or the support matrix for the writing monomers and initiating agents. For example, in some embodiments, polymeric binders 622 may include a low refractive index (e.g., <1.5) rubbery polymer (e.g., a polyurethane), which may provide mechanical support during the holographic exposure and ensure the refractive index modulation by the light pattern is permanently preserved.

Imaging components 614 including the writing monomers and the polymerization initiating agents may be dispersed in the support matrix. The writing monomers may serve as refractive index modulators. For example, the writing monomers may include high refractive index acrylate monomers which can react with the initiators and polymerize. The photosensitizing dyes may be used to absorb light and interact with the initiators to produce active species, such as radicals, cations (e.g., acids), or anion (e.g., bases). The active species (e.g., radicals) may initiate the polymerization by attacking a monomer. For example, in some monomers, one electron pair may be held securely between two carbons in a sigma bond and another electron pair may be more loosely held in a pi bond, and the free radical may use one electron from the pi bond to form a more stable bond with a first carbon atom in the two carbon atoms. The other electron from the pi bond may return to the second carbon atom in the two carbon atoms and turn the whole molecule into another radical. Thus, a monomer chain (e.g., a polymer) may be formed by adding additional monomers to the end of the monomer chain and transferring the radical to the end of the monomer chain to attack and add more monomers to the chain.

During the recording process (e.g., the second stage), an interference pattern generated by the interference between two coherent beams 640 and 642 may cause the photosensitizing dyes and the initiators in the bright fringes to generate active species, such as radicals, cations (e.g., acids), or anion (e.g., bases), from the initiators, where the active species (e.g., radicals) may transfer from the initiators to monomers and cause the polymerization of the monomers in the bright fringes as described above. The initiators or radicals may be bound to the polymer matrix when abstracting the hydrogen atoms on the polymer matrix. The radicals may be transferred to the ends of the chains of monomers to add more monomers to the chains. While the monomers in the bright fringes are attached to chains of monomers, monomers in the unexposed dark regions may diffuse to the bright fringes to enhance the polymerization. As a result, polymerization concentration and density gradients may be formed in photopolymer film 620, resulting in refractive index modulation in photopolymer film 620 due to the higher refractive index of the writing monomers. For example, areas with a higher concentration of monomers and polymerization may have a higher refractive index. Thus, a hologram or a holographic optical element 630 may be formed in photopolymer film 620.

During the exposure, a radical at the end of one monomer chain may combine with a radical at the end of another monomer chain to form a longer chain and terminate the polymerization. In addition to the termination due to radical combination, the polymerization may also be terminated by disproportionation of polymers, where a hydrogen atom from one chain may be abstracted to another chain to generate a polymer with a terminal unsaturated group and a polymer with a terminal saturated group. The polymerization may also terminated due to interactions with impurities or inhibitors (e.g., oxygen). In addition, as the exposure and polymerization proceed, fewer monomers may be available for diffusion and polymerization, and thus the diffusion and polymerization may be suppressed. The polymerization may stop until there are no more monomers or until the monomer chains terminate for an exposure. After all or substantially all monomers have been polymerized, no more new holographic optical elements 630 (e.g., gratings) may be recorded in photopolymer film 620.

In some embodiments, the recorded holographic optical elements in the photosensitive material layer may be UV cured or thermally cured or enhanced, for example, for dye bleaching, completing polymerization, permanently fixing the recorded pattern, and enhancing the refractive index modulation. At the end of the process, a holographic optical element, such as a holographic grating, may be formed. The holographic grating may be a volume Bragg grating with a thickness of, for example, a few, or tens, or hundreds of microns.

To generate the desired light interference pattern for recording the HOEs, two or more coherent beams may generally be used, where one beam may be a reference beam and another beam may be an object beam that may have a desired wavefront profile. When the recorded HOEs are illuminated by the reference beam, the object beam with the desired wavefront profile may be reconstructed.

In some embodiments, the holographic optical elements may be used to diffract light outside of the visible band. For example, IR light or NIR light (e.g., at 940 nm or 850 nm) may be used for eye-tracking. Thus, the holographic optical elements may need to diffract IR or NIR light, but not the visible light. However, there may be very few holographic recording materials that are sensitive to infrared light. As such, to record a holographic grating that can diffract infrared light, recording light at a shorter wavelength (e.g., in visible or UV band, such as at about 660 nm, about 532 nm, about 514 nm, or about 457 nm) may be used, and the recording condition (e.g., the angles of the two interfering coherent beams) may be different from the reconstruction condition.

Figure 7B:
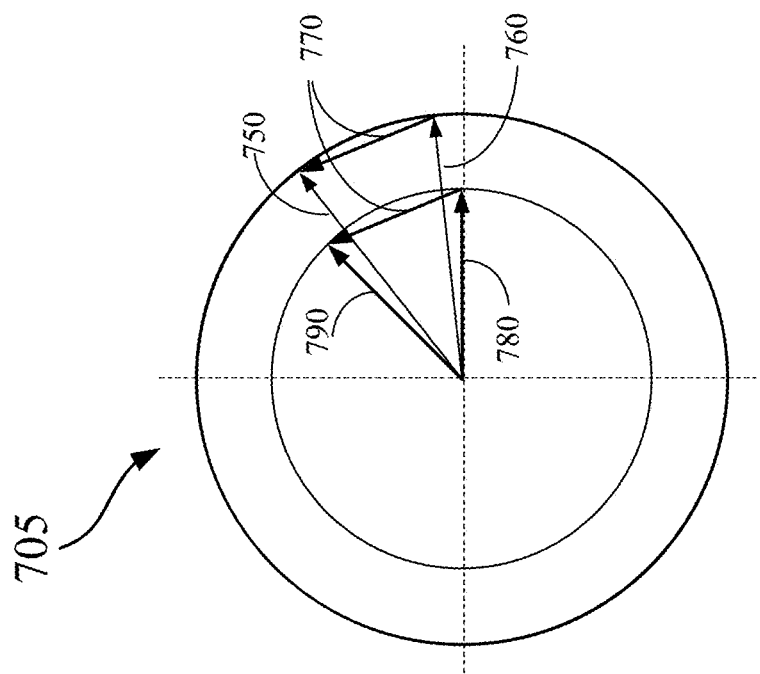
FIG. 7B is an example of a holography momentum diagram illustrating the wave vectors of recording beams and reconstruction beams and the grating vector of the recorded volume Bragg grating.
Figure 7A:
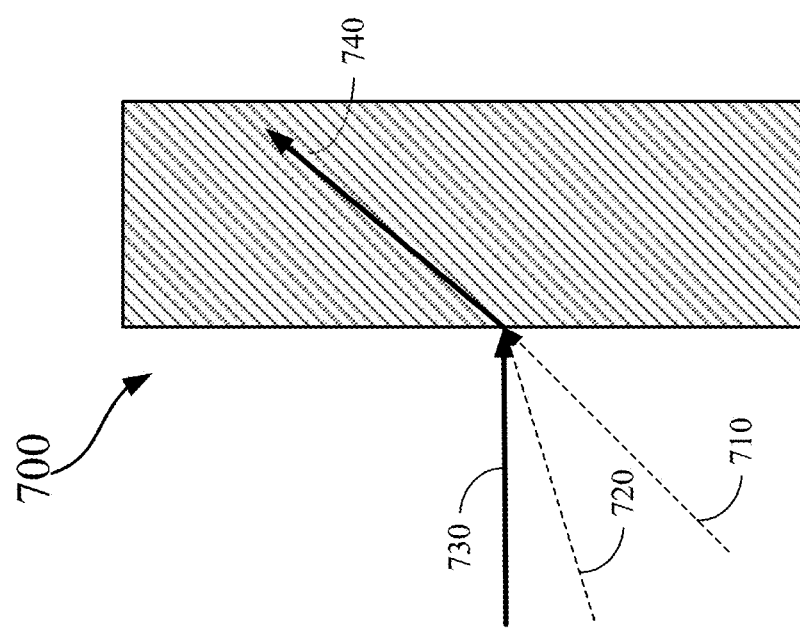
FIG. 7A illustrates the recording light beams for recording a volume Bragg grating and the light beam reconstructed from the volume Bragg grating.

FIG. 7A illustrates the recording light beams for recording a volume Bragg grating 700 and the light beam reconstructed from volume Bragg grating 700. In the example illustrated, volume Bragg grating 700 may include a transmission volume hologram recorded using a reference beam 720 and an object beam 710 at a first wavelength, such as 660 nm. When a light beam 730 at a second wavelength (e.g., 940 nm) is incident on volume Bragg grating 700 at a 0° incident angle, the incident light beam 730 may be diffracted by volume Bragg grating 700 at a diffraction angle as shown by a diffracted beam 740.

FIG. 7B is an example of a holography momentum diagram 705 illustrating the wave vectors of recording beams and reconstruction beams and the grating vector of the recorded volume Bragg grating. FIG. 7B shows the Bragg matching conditions during the holographic grating recording and reconstruction. The length of wave vectors 750 and 760 of the recording beams (e.g., object beam 710 and reference beam 710) may be determined based on the recording light wavelength $\lambda_c$ (e.g., 660 nm) according to $2\pi n/\lambda_c$, where n is the average refractive index of holographic material layer. The directions of wave vectors 750 and 760 of the recording beams may be determined based on the desired grating vector K (770) such that wave vectors 750 and 760 and grating vector K (770) can form an isosceles triangle as shown in FIG. 7B. Grating vector K may have an amplitude $2\pi/\Lambda$, where $\Lambda$ is the grating period. Grating vector K may in turn be determined based on the desired reconstruction condition. For example, based on the desired reconstruction wavelength $\lambda_r$ (e.g., 940 nm) and the directions of the incident light beam (e.g., light beam 730 at 0°) and the desired diffracted light beam (e.g., diffracted beam 740), grating vector K (770) of volume Bragg grating 700 may be determined based on the Bragg condition, where wave vector 780 of the incident light beam (e.g., light beam 730) and wave vector 790 of the diffracted light beam (e.g., diffracted beam 740) may have an amplitude $2\pi n/\lambda_r$, and may form an isosceles triangle with grating vector K (770) as shown in FIG. 7B.

As described above, for a given wavelength, there may only be one pair of incident angle and diffraction angle that meets the Bragg condition perfectly. Similarly, for a given incident angle, there may only be one wavelength that meets the Bragg condition perfectly. When the incident angle of the reconstruction light beam is different from the incident angle that meets the Bragg condition of the volume Bragg grating or when the wavelength of the reconstruction light beam is different from the wavelength that meets the Bragg condition of the volume Bragg grating, the diffraction efficiency may be reduced as a function of the Bragg mismatch factor caused by the angular or wavelength detuning from the Bragg condition. As such, the diffraction may only occur in a small wavelength range and a small incident angle range.

Figure 8:
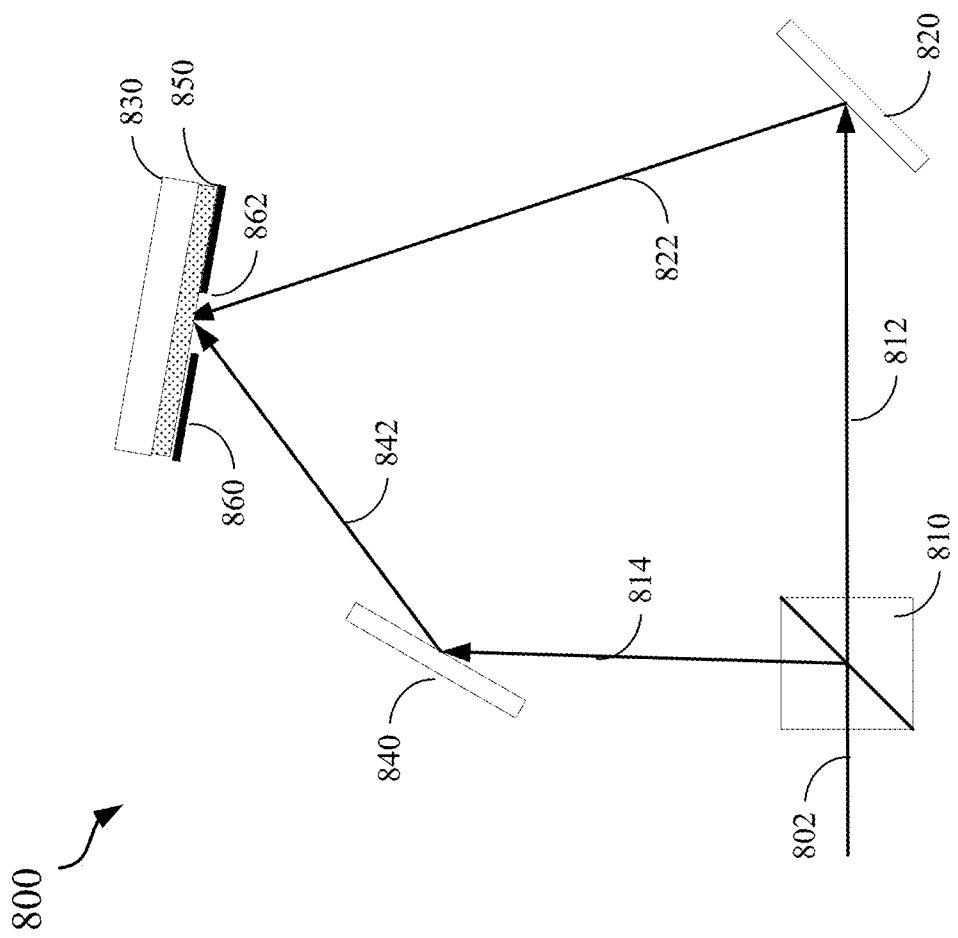
FIG. 8 illustrates an example of a holographic recording system for recording holographic optical elements.

FIG. 8 illustrates an example of a holographic recording system 800 for recording holographic optical elements. Holographic recording system 800 includes a beam splitter 810 (e.g., a beam splitter cube), which may split an incident collimated laser beam 802 into two light beams 812 and 814 that are coherent and have similar intensities. Light beam 812 may be reflected by a first mirror 820 towards a plate 830 as shown by the reflected light beam 822. On another path, light beam 814 may be reflected by a second mirror 840. The reflected light beam 842 may be directed towards plate 830, and may interfere with light beam 822 at plate 830 to generate an interference pattern that may include bright fringes and dark fringes. In some embodiments, plate 830 may also be a mirror. A holographic recording material layer 850 may be formed on plate 830 or on a substrate mounted on plate 830. The interference pattern may cause the holographic optical element to be recorded in holographic recording material layer 850 as described above.

In some embodiments, a mask 860 may be used to record different HOEs at different regions of holographic recording material layer 850. For example, mask 860 may include an aperture 862 for the holographic recording and may be moved to place aperture 862 at different regions on holographic recording material layer 850 to record different HOEs at the different regions under different recording conditions (e.g., recording beams with different angles).

Holographic recording materials can be selected for specific applications based on some parameters of the holographic recording materials, such as the spatial frequency response, dynamic range, photosensitivity, physical dimensions, mechanical properties, wavelength sensitivity, and development or bleaching method for the holographic recording material.

The dynamic range indicates the refractive index change that can be achieved in a holographic recording material.

The dynamic range may affect, for example, the thickness of the device to achieve a high efficiency, and the number of holograms that can be multiplexed in a holographic material layer. The dynamic range may be represented by the refractive index modulation (RIM), which may be one half of the total change in refractive index. In generally, a large refractive index modulation in the holographic optical elements is desired in order to improve the diffraction efficiency and record multiple holographic optical elements in a same holographic material layer. However, for holographic photopolymer materials, due to the solubility limitation of the monomers in the holographic photopolymer materials, the maximum achievable refractive index modulation or dynamic range may be limited.

The spatial frequency response is a measure of the feature size that the holographic material can record and may dictate the types of Bragg conditions that can be achieved. The spatial frequency response can be characterized by a modulation transfer function, which may be a curve depicting the sinusoidal waves of varying frequencies. In general, a single spatial frequency value may be used to represent the frequency response, which may indicate the spatial frequency value at which the refractive index modulation begins to drop or at which the refractive index modulation is reduced by 3 dB. The spatial frequency response may also be represented by lines/mm, line pairs/mm, or the period of the sinusoid.

The photosensitivity of the holographic recording material may indicate the photo-dosage used to achieve a certain efficiency, such as 100% (or 1% for photo-refractive crystals). The physical dimensions that can be achieved in a particular holographic material may affect the aperture size as well as the spectral selectivity of the HOE device. Physical parameters of holographic recording materials may include, for example, damage thresholds and environmental stability. The wavelength sensitivity may be used to select the light source for the recording setup and may also affect the minimum achievable period. Some materials may be sensitive to light in a wide wavelength range. Many holographic materials may need post-exposure development or bleaching. Development considerations may include how the holographic material is developed or otherwise processed after the recording.

To record holographic optical elements for artificial reality system, it may be desirable that the photopolymer material is sensitive to visible light, can produce a large refractive index modulation Δn (e.g., high dynamic range), and have temporally and spatially controllable reaction and/or diffusion of the monomers and/or polymers such that chain transfer and termination reactions can be suppressed.

FIGS. 9A-9D illustrate an example of free radical polymerization in an example of a photopolymer material. Free radical polymerization can be used to polymerize a wide range of monomers, including olefins (e.g., ethylene and propylene) and vinyl monomers (e.g. vinylidene chloride, styrene, and methyl methacrylate), and is less sensitive to reactant impurities than, for example, anionic polymerization. Free radical polymerization generally includes the initiation, propagation, and termination of a monomer chain. In free radical polymerization, during the polymerization processes, monomer chains may be continuously initiated, propagated, and terminated.

FIG. 9A illustrates the photopolymer material before polymerization. The photopolymer material shown in FIG. 9A may include a polymer matrix 910 (e.g., polyurethane), unreacted writing monomers 920 (e.g., acrylate monomers), and initiators 930. As described above, in some embodiments, the photopolymer material may also include some photosensitizing dyes and/or chain transfer agents (not shown). Unreacted writing monomers 920 and initiators 930 may be dispersed in polymer matrix 910.

FIG. 9B illustrates the initiation of monomer chains, where radicals 940 are generated. Radicals for polymerization may be generated by, for example, photolysis, thermal decomposition, ionizing radiation, electrolysis, and the like. In the example shown in FIG. 9B, radicals 940 may be generated from the initiators immediately upon exposure to holographic recording light, which may cleave a bond in the initiators to produce the radicals.

FIG. 9C illustrates the propagation of the monomer chains, where radicals 940 may initiate the polymerization and propagate to chain ends to add more monomers. As described above, radicals 940 may initiate the polymerization by attacking a monomer 920. For example, in some monomers, an electron pair may be loosely held in a pi bond between two carbon atoms, and a radical 940 may use one electron from the pi bond to form a more stable bond with a first one of the two carbon atom. The other electron from the pi bond may return to the second carbon atom and turn the whole molecule into another radical. Thus, a monomer chain 950 may start to be formed by adding additional monomers 920 to the end of monomer chain 950 and transferring radical 940 to the end of monomer chain 950 to add more monomers 920 to the chain. As described above with respect to FIG. 6, initiators 930 or radicals 940 may react with and attach to polymer matrix 910 by hydrogen abstraction and chain transfer reactions, such that monomer chains 950 attached to the initiators may be attached to polymer matrix 910 through the initiator.

FIG. 9D illustrates the termination of the monomer chains, where a radical 940 at the end of a monomer chain 950 may combine, for example, with a radical 940 at the end of another monomer chain 950 to form a longer monomer chain 960, or with inhibiting species 970 (e.g., 02). In some embodiments, the polymerization may also be terminated by disproportionation of polymers, where a hydrogen atom from one chain end may be abstracted to another chain end to generate a polymer with a terminal unsaturated group and a polymer with a terminal saturated group.

The performance of a holographic photopolymer may depend on how species diffuse and react during polymerization. In free radical polymerization, the polymerization and diffusion generally occur simultaneously in a relatively uncontrolled fashion, which may lead to some undesirable results.

Figures 10A, 10B, 10C:
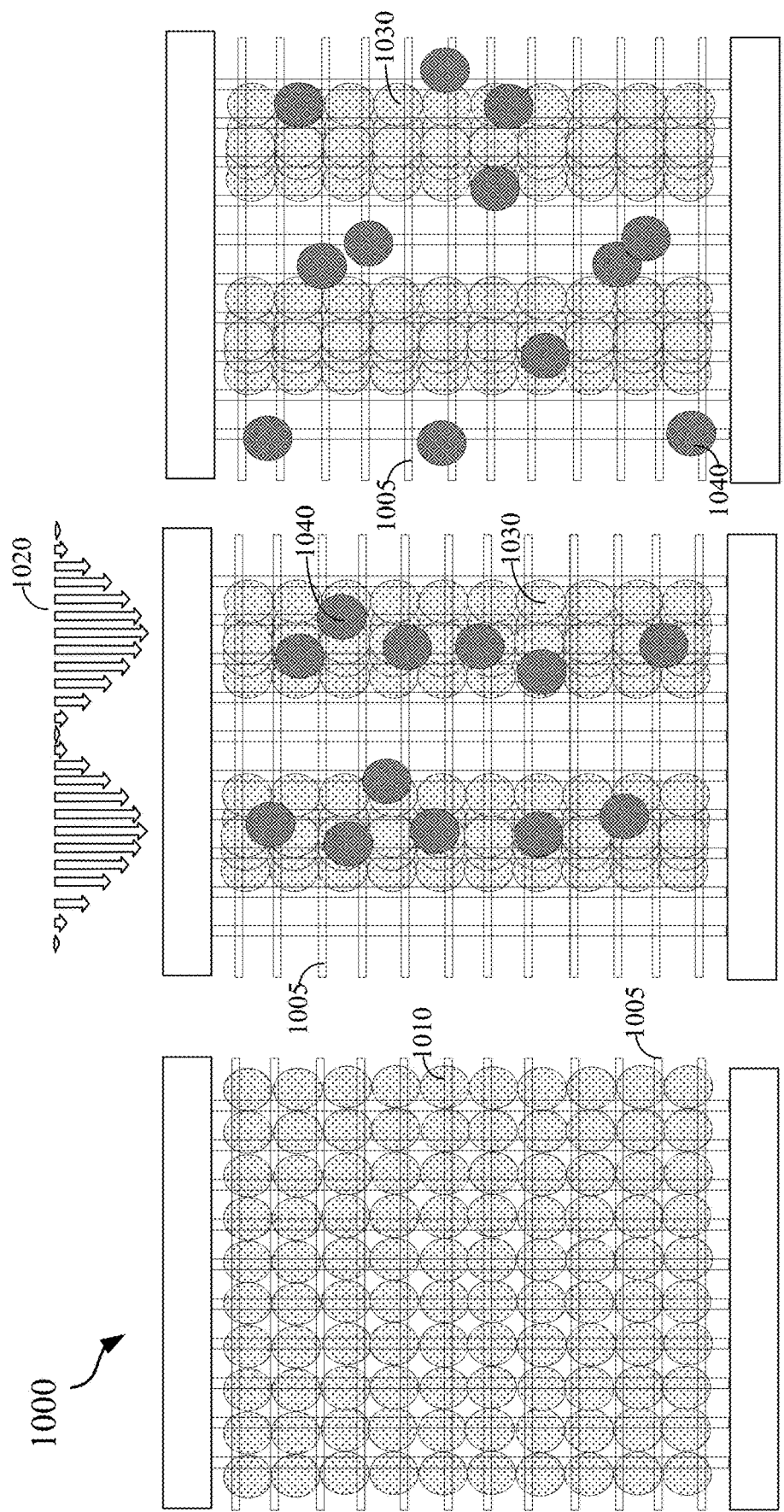
FIGS. 10A-10C illustrate an example of recording a holographic optical element in an uncontrolled photopolymer material layer.

FIGS. 10A-10C illustrate an example of recording a holographic optical element in an uncontrolled photopolymer material layer 1000. FIG. 10A illustrates the unexposed photopolymer material layer 1000 that may include monomers 1010 suspended in a resin that may include a supporting polymer matrix 1005 (e.g., a cross-linked matrix formed by polymeric binders 622). Monomers 1010 may be substantially evenly distributed within photopolymer material layer 1000.

FIG. 10B illustrates an example of monomer diffusion and polymerization during holographic recording. When photopolymer material layer 1000 is exposed to a light pattern 1020, monomers 1010 may diffuse to the bright fringes in photopolymer material layer 1000 and polymerize to form polymers 1030 and 1040 in the bright fringes as described above. Some polymers, such as polymers 1030 may be bound to polymer matrix 1005. Some polymers, such as polymers 1040, may not be bound to polymer matrix 1005.

FIG. 10C illustrates an example of polymer diffusion after the holographic recording. As described above, some polymers 1040 that are formed in the bright fringes during the exposure and are not bound to polymer matrix 1005 may be free to diffuse in photopolymer material layer 1000. Some polymers 1040 may diffuse out of the exposed regions (e.g., the bright fringes) into unexposed regions, which may blur the resultant fringes of different refractive indices. In some cases, when the concentration of radicals on the exposed region is high, some unterminated radicals or radicals unattached to polymer matrix 1005 may also diffuse into the unexposed regions and cause polymerization in the unexposed regions. Thus, the diffusion of the unbound polymers or radicals into the unexposed regions may reduce the refractive index modulation $\Delta n$, the diffraction efficiency, and the minimum pitch of the recorded holographic optical elements. Thus, it may be desirable to attach polymers 1040 to polymer matrix 1005 in the exposed regions and stop the diffusion and polymerization after the exposure to reduce or prevent the diffusion of polymers 1040 or radicals to the unexposed regions.

In addition, during the exposure, the refractive index modulation $\Delta n$ caused by the immediate initiation and polymerization may form intermediate holographic optical elements in the photopolymer material layer. The intermediate holographic optical elements may change the exposure light pattern in the photopolymer material layer, such as scattering or diffracting light in the exposure light pattern, which may lead to the formation of noisy gratings and cause haze and a loss of clarity in an optical system that uses such a holographic optical element, such as a waveguide display or eye-tracking system.

Furthermore, when the radical polymerization is uncontrolled (e.g., the polymerization continues after the exposure) and a series of exposures with constant dose or exposure is used to create a multiplexed hologram, the first exposure may consume most of the monomers, leading to an exponential decrease in refractive index modulation and diffraction efficiency for each subsequent exposure. Thus, a complicated dose scheduling procedure may be needed to balance the diffraction efficiency of the holograms in a multiplexed hologram.

For at least these reasons, a controlled radical polymerization (CRP) photopolymer holographic material may be needed in order to achieve the desired refractive index modulation, frequency response, diffraction efficiencies, and the like. Examples of CRP may include atom transfer radical polymerization (ATRP), reversible addition-fragmentation chain transfer (RAFT) polymerization, and nitroxide mediated polymerization (NMP). In controlled radical polymerization, irreversible radical terminations and transfer reactions may be suppressed by keeping a very low concentration of radicals throughout the polymerization. A dynamic equilibrium may be established between a low concentration of active propagating chains and a predominant amount of reversible dormant chains that may be reactivated for chain extension.

Atom transfer radical polymerization (ATRP) is based on an inner sphere electron transfer process, and generally uses an organic halide (e.g., alkyl halide) as an initiator and a transition metal complex as a catalyst. ATRP involves the reactivation of an initially formed alkyl halide adduct with an unsaturated compound (e.g., monomer) to generate an intermittently formed radical, and the further reaction of the intermittently formed radical with additional monomers. Various transition metal complexes, such as complexes of Cu, Fe, Ru, Ni, and Os, may be used as the catalysts for ATRP. During polymerization, halogen may be abstracted from the organic halide, and radicals produced by, for example, light, may be added to the double bond of alkene. The radical generation and halogen transfer may be catalyzed by the metal complex, which may make the halogen transfer much more efficient.

Figure 11A:
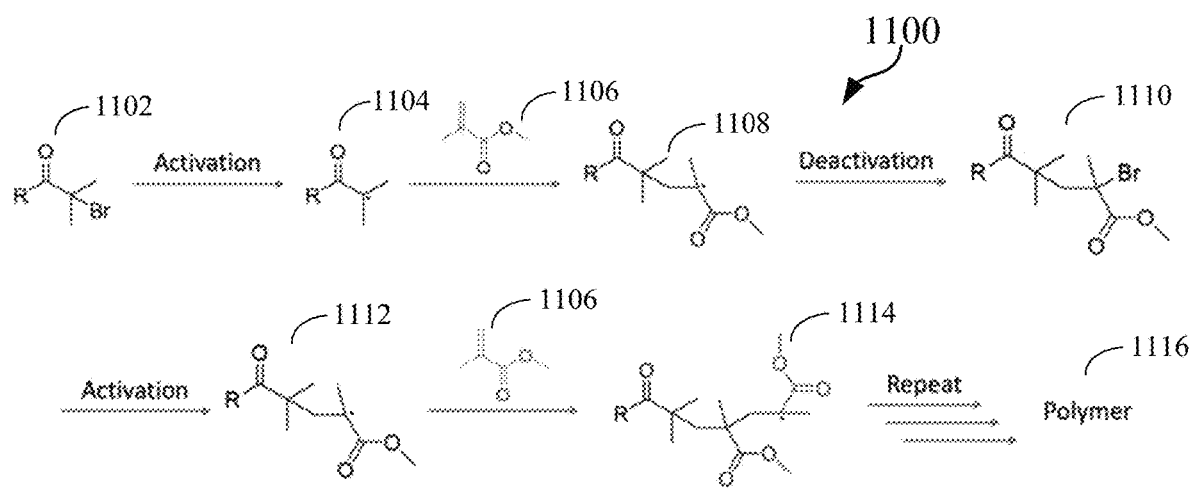
FIG. 11A illustrates an example of an atom transfer radical polymerization (ATRP) process.

FIG. 11A illustrates an example of atom transfer radical polymerization (ATRP) process 1100. In ATRP process 1100, an initiator R—X (1102), such as a alkyl halide or a dormant halogen end-capped polymer chain, may be activated to abstract the halogen (X) and form a radical 1104, which may attack a monomer 1106 as described above to form a longer polymer chain 1108 that includes a radical transferred to the end of polymer chain 1108. Polymer chain 1108 may be deactivated by bonding to a halogen to form another halogen end-capped polymer chain 1110, which is a dormant polymer chain. Halogen end-capped polymer chain 1110 may be reactivated again to abstract the halogen and form a radical 1112, which may be similar to radical 1108 and may attack another monomer 1106 to form an even longer polymer chain 1114 that includes a radical transferred to the end of polymer chain 1114. Polymer chain 1114 may be repeatedly deactivated and reactivated to form a longer polymer 1116. The number of polymer chains in the polymerization may be determined by the number of initiators or radicals. Each chain may have the same probability to propagate with monomers to form living or dormant polymer chains. As a result, polymers with similar molecular weights and thus a narrow molecular weight distribution can be generated.

Therefore, in an ATRP process, dormant species can be activated by a transition metal complex to generate radicals via an electron transfer process. The transition metal may be oxidized to a higher oxidation state. The active radicals may be deactivated by bonding to a halogen. This reversible process may establish an equilibrium between the alkyl halide R—X (or halogen end-capped polymer chain $P_n$-X) and the corresponding radical R$^{\bullet}$ (or $P_n^{\bullet}$) by a transition metal complex. At the end of a polymerization, the chain ends may be reversibly terminated by halogen end-capping (e.g., living but dormant) and the dormant chains may be reactivated and used as macro initiators for further polymerizations. It may be desirable that the equilibrium shifts towards the dormant species in order to keep the radical concentration low, thereby suppressing radical termination reactions and enabling control over the polymer architecture. Terminations in the beginning of the polymerization may lead to a build-up of the deactivator (i.e. X-$Mt^{n+1}$-Y/ligand) concentration. Consequently, the equilibrium may be shifted towards the dormant species and the radical concentration may be lowered, and thus the polymerization may be self-regulated to generate polymers with similar length or low dispersity (or high uniformity).

Figure 11B:
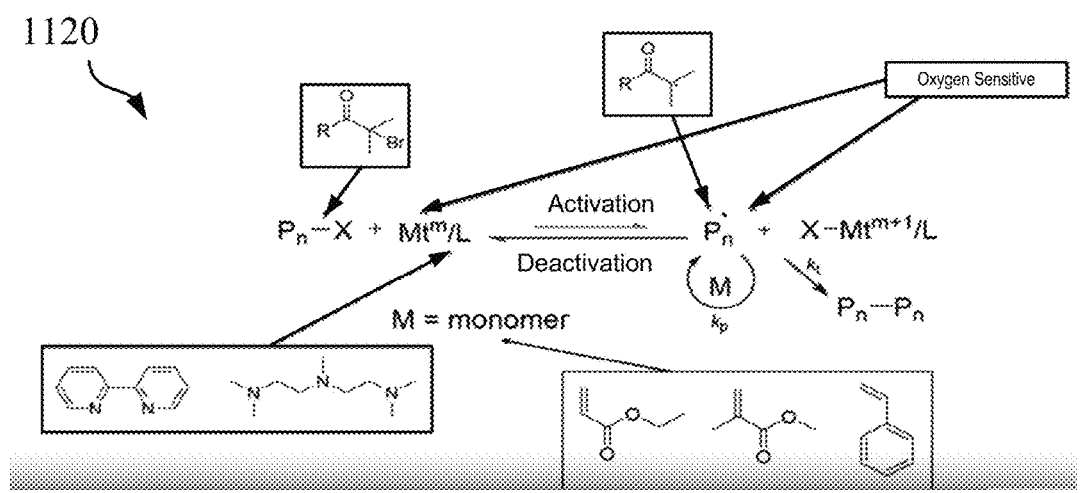
FIG. 11B illustrates an example of a scheme of atom transfer radical polymerization.

FIG. 11B illustrates an example of a scheme 1120 of atom transfer radical polymerization (ATRP). ATRP involves a reversible halogen transfer between an initiator R—X (e.g., alkyl halide) or a dormant propagating chain end R-$P_n$-X (or simply $P_n$-X), and a transition metal complex $Mt^m$/L in a lower oxidation state as the catalyst, where R or $P_n$ is a polymer chain, X is a halogen (e.g., Br or Cl), Mt is a transition metal (e.g., copper, iron, cobolt, ruthenium, or nickel), and L is a complexing ligand. Examples of the initiator $P_n$-X, complexing ligand L, and radicals R$^{\bullet}$ (or $P_n^{\bullet}$) are shown in FIG. 11B. The ATRP process may result in the formation of propagating radicals R$^{\bullet}$ (or $P_n^{\bullet}$) and metal complexes in the higher oxidation states with a coordinated halide ligand (e.g. X-$Mt^{m+1}$/L). The active radicals may be generated at a rate of activation $k_{act}$, propagate to add more monomers M at a rate $k_p$, and are reversibly deactivated at a rate $k_{deact}$. Examples of monomers M are shown in FIG. 11B as well. Since the ATRP is a radical based process, the active species may also terminate to form polymer $P_n$-$P_n$ at a rate $k_t$. As the reaction progresses, radical termination may be diminished as a result of, for example, the persistent radical effect, increased chain length, and conversion and viscosity. Thus, the equilibrium may be strongly shifted towards the dormant species, i.e., $k_{act} \ll k_{deact}$, and the radicals may have a shorter lifetime to diffuse or add more monomers to the polymer chains. The equilibrium may be affected by, for example, temperature, pressure, media or solvent, initiators (e.g., alkyl halides), and catalyst (e.g., transition metal complexes).

Figure 11C:
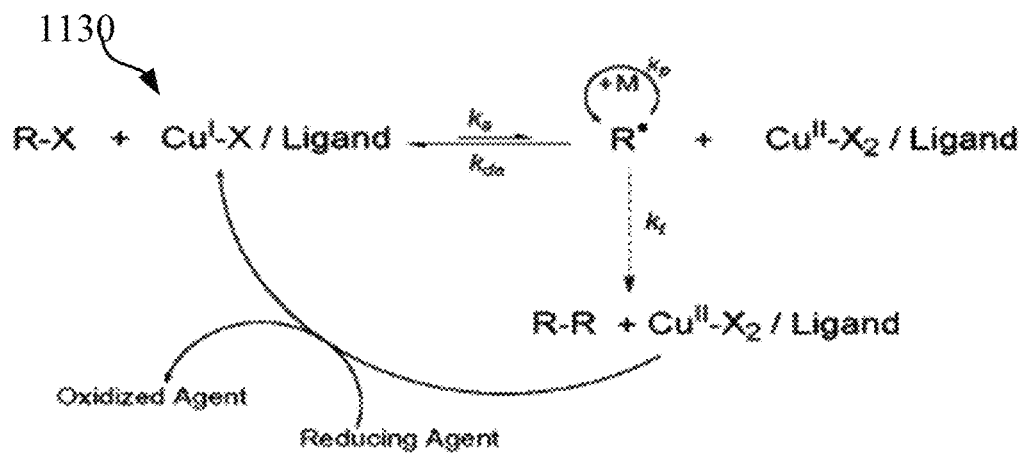
FIG. 11C illustrates another example of a scheme of atom transfer radical polymerization.

FIG. 11C illustrates an example of a scheme 1130 of atom transfer radical polymerization (ATRP). Scheme 1130 may be a specific example of scheme 1120. As described above, several different transition metals, such as copper, iron, cobolt, ruthenium, and nickel (usually in the form of salts with chlorine, bromine, or iodine), can be used in ATRP along with various complexing ligands, such as nitrogen and phosphine based structures. One most commonly used transition metal is copper, due to its low cost and versatility. The ligand may solubilize the metal ion, which may also affect the reduction potential of the transition metal ion. Alkyl bromides, chlorides, and iodides may be used as initiators. Some examples of ligands may include bipy, PMDETA, HMTETA, Me$_6$-TERN, pPPh3, N-(alkyl)-2-pyridyl-methmanimine, and the like. Some examples of alkyl halides may include EBiB, MBrP, PEBr, and the like.

ATRP reactions may be very robust because they are tolerant of many functional groups, such as allyl, amino, epoxy, hydroxy, and vinyl groups, present in either the monomers or the initiators. ATRP may also be advantageous due to the ease of preparation, and inexpensive catalysts (e.g., copper complexes), pyridine-based ligands, and initiators (e.g., alkyl halides).

In some embodiments, the control over the ATRP reaction can be improved by the addition of small amounts of the deactivator, which may help to shift the equilibrium towards the dormant species. For example, 10% deactivator relative to the activator concentration may be added, which may correspond to the amount of deactivator formed during the polymerization due to irreversible terminations as described above.

Reversible Addition Fragmentation chain Transfer (RAFT) polymerization is another reversible deactivation radical polymerization technique for providing living characteristics to radical polymerization. Some RAFT materials may include a chain transfer agent in the form of a thiocarbonylthio compound (e.g., such as dithioesters, thiocarbamates, and xanthates) or similar compound to mediate the polymerization and control the generated molecular weight and polydispersity during a free radical polymerization. Advantages of RAFT polymerization may include the ability to control the polymerization of most monomers polymerizable by radical polymerization, such as (meth)acrylates, (meth) acrylamides, acrylonitrile, styrenes, dienes, and vinyl monomers; tolerance of unprotected functionality in monomer and solvent (e.g., OH, NR$_2$, COOH, CONR$_2$, or SO$_3$H) where polymerizations may be carried out in aqueous or protic media; compatibility with reaction conditions (e.g., bulk, organic or aqueous solution, emulsion, mini-emulsion, or suspension); and ease of implementation and inexpensive relative to competitive technologies.

Figure 12:
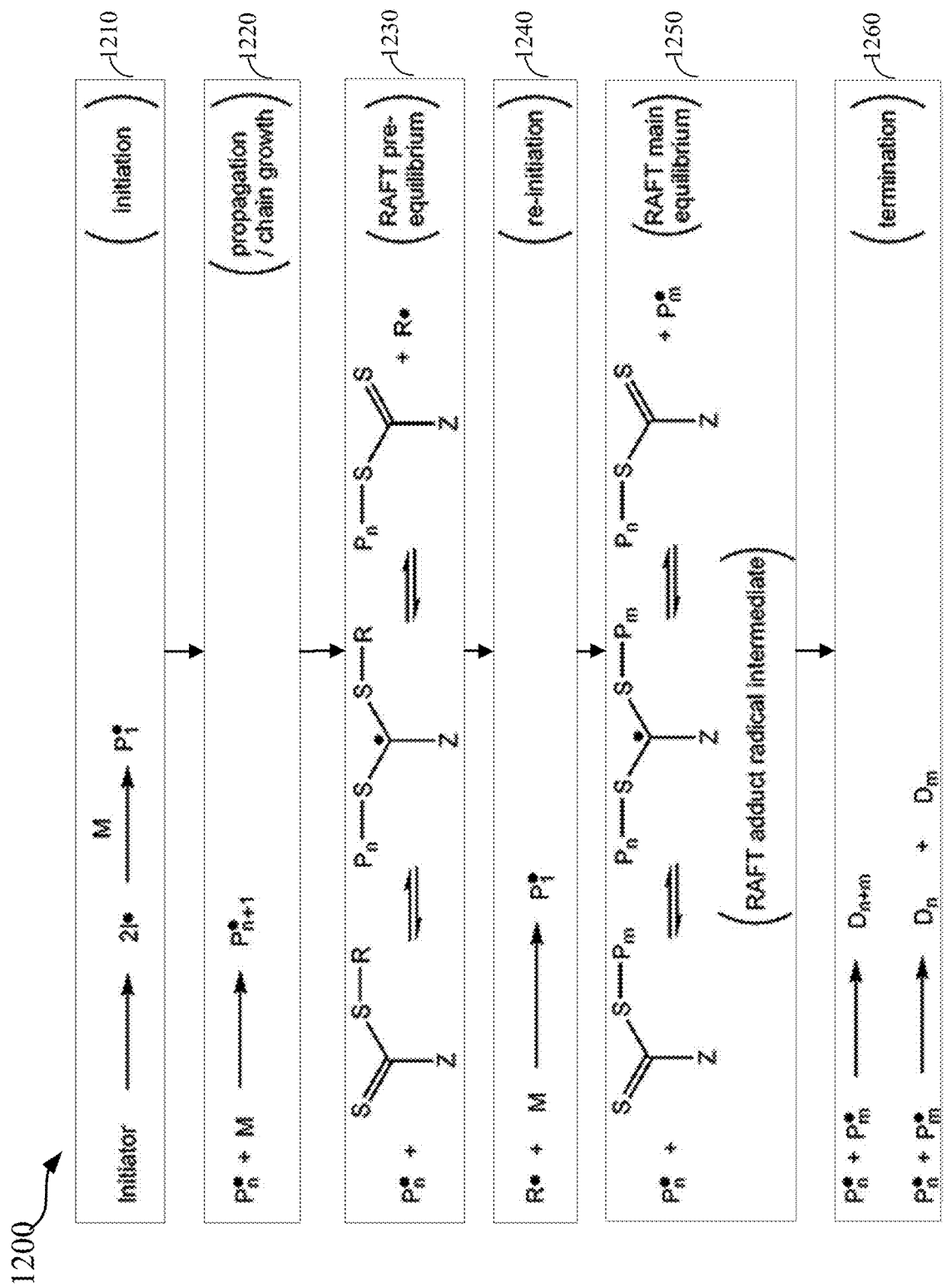
FIG. 12 illustrates an example of reversible addition fragmentation chain transfer (RAFT) polymerization process.

FIG. 12 illustrates an example of reversible addition fragmentation chain transfer (RAFT) polymerization process 1200. RAFT polymerization process 1200 may include, for example, initiation at block 1210, propagation or chain growth at block 1220, pre-equilibrium at block 1230, re-initiation at block 1240, main equilibrium at block 1250, and termination at block 1260.

RAFT polymerization process 1200 may start at block 1210, where a free radical source that may include a decomposing radical initiator, such as AIBN, may decompose to form two fragments (I$^\bullet$). The fragments (I$^\bullet$) may react with a single monomer molecule to yield a propagating (i.e., growing) polymeric radical $P_1^\bullet$ of length one.

At block 1220, a propagating radical $P_n^\bullet$ of length n in its active (radical) form may be added to a monomer M to form a longer propagating radical $P_{n+1}^\bullet$.

At block 1230, a propagating radical $P_n^\bullet$ with n monomers may react with a RAFT agent (e.g., chain transfer agent Thiocarbamates (S=C(Z)S-$P_n$)) to form an intermediate RAFT adduct radical with $P_n$ and R on two ends:

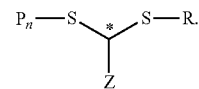

The intermediate RAFT adduct radical may undergo a fragmentation reaction in either direction to yield either the starting species (e.g., propagating radical $P_n^\bullet$ and the RAFT agent), or a radical R$^\bullet$ and a polymeric RAFT agent (S=C(Z)S-$P_n$). This process may be reversible, where the intermediate RAFT adduct radical may lose either the radical R$^\bullet$ or the propagating radial $P_n^\bullet$.

At block 1240, the radical R$^\bullet$ may react with another monomer species to start another active polymer chain.

At block 1250, by a process of rapid interchange, the radicals and opportunities for polymer chain growth may be shared among species that have not undergone termination, such as polymeric radical $P_n^\bullet$ and polymeric RAFT agent (S=C(Z)S-$P_n$). A rapid equilibrium may be formed between the dormant species and active propagating radicals $P_n^\bullet$ and $P_m^\bullet$. The radicals may be shared equally by the polymer chains, causing the polymer chains to have equal opportunities for growth and a narrow dispersity.

At block 1260, polymer chains in their active forms may react via bi-radical termination to form chains that may not be reactivated to react further. It may be desirable that the RAFT adduct radical is sufficiently hindered such that it does not undergo termination reactions. For RAFT polymerization, the termination reaction may be minimized due to the existence of thiocarbonylthio end-group in resultant polymer chains.

Nitroxide mediated polymerization (NMP) generally uses an alkoxyamine initiator

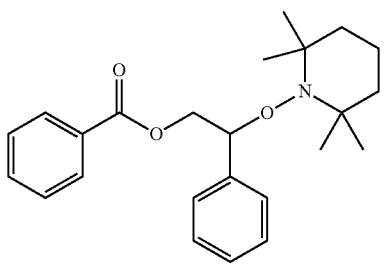 [SMILES: CC1(C)CCCC(C)(C)N1OC(COC(=O)c1ccccc1)c1ccccc1]

to generate polymers with well controlled stereochemistry and a very low polydispersity index (i.e., dispersity). NMP generally employs a nitroxide, such as 2,2,6,6-tetramethyl-1-piperidinyloxyl (TEMPO), to reversibly deactivate or trap growing polymer radicals to form dormant alkoxyamines. At an elevated temperature, for example, about 100-125° C., the equilibrium coefficient for radical deactivation Keq=$k_{act}/k_{deact}$ for TEMPO and polystyrene radicals may greatly favor the formation of the dormant alkoxyamine. As a result, the polymer radicals may be predominantly dormant in NMP, which may reduce the likelihood of bimolecular termination. Because monomers may only be added to the growing polymer radicals between successive activation and deactivation reactions, the rate of polymerization may be slower than in conventional free radical polymerization. NMP is relatively insensitive to impurities and can be performed without the need to purify solvents or reagents. Additionally, NMP can be performed in many heterogeneous systems, such as suspension, dispersion, emulsion, and mini-emulsion.

Figure 13:
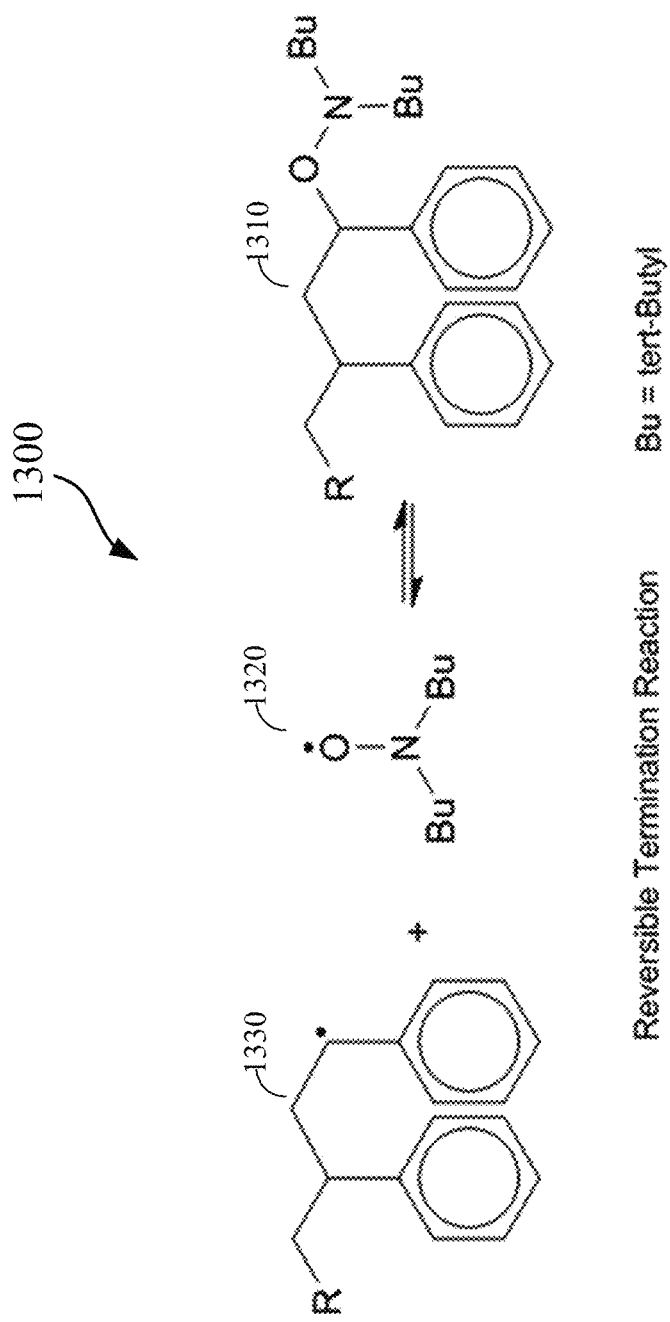
FIG. 13 illustrates an example of a scheme for nitroxide mediated polymerization (NMP).

FIG. 13 illustrates an example of a scheme 1300 for NMP. The initiators for NMP may be alkoxyamines 1310. An alkoxyamine 1310 may be viewed as an alcohol bound to a secondary amine by a N—O single bond. Under certain conditions, homolysis of the C—O bond can occur to generate a stable nitroxide radical 1320 in the form of a 2-center 3-electron N—O system, and a carbon radical 1330 which may serve as an initiator for radical polymerization. The R groups attached to the nitrogen may be bulky, sterically hindering groups, and the R group in the O-position may form a stable radical, which may be benzylic for polymerization to occur successfully. The nitroxide radical may be a persistent radical and the carbon radical may be a transient radical. This may lead to repeated coupling of the nitroxide radicals to the growing end of a polymer chain. Because of the high rate of coupling of the nitroxide radicals to the growing chain end, there may be little coupling of two active growing chains that may be an irreversible termination. Thus, due to the particularly stable nitroxide radicals, the nitroxide radicals may have greater and greater concentrations as the reaction progresses. The carbon radical is transient, reacting quickly with either itself in a termination step or with the persistent radical to form a desired product. As time goes on, a higher concentration of the persistent radicals may be present, such that any of the transient radicals still present may couple with the persistent radicals due to the greater availability of the persistent radicals. Therefore, the nitroxide radicals may protect the growing chain from the termination processes. At any given time, almost all growing chains may be end-capped by a respective mediating nitroxide radical and may dissociate and grow at similar rates, creating a largely uniform chain length and structure. NMP may allow for the control of chain length and structure and may allow polymerization to continue as long as there are monomers available.

As described above, in order to fabricate holographic optical elements having desired refractive index modulation, frequency response, diffraction efficiency, and the like, it is desirable to use a photopolymer material that is sensitive to visible light, has a high dynamic range, and has both spatially and temporally controllable reaction and/or diffusion such that chain transfer and termination reactions can be suppressed. To spatially and temporally control the reaction and/or diffusion of the monomers and/or polymers during HOE recording, it is desirable to use controlled radical polymerization (CRP) materials. The above described CRP materials may be controlled or activated by temperature, pressure, media or solvent, initiators (e.g., alkyl halides), and catalyst (transition metal complexes). For example, ATRP may generally be performed at about 65-90° C., RAFT may be performed at about 90-110° C., and NMP may be performed at about 100-125° C., using thermal decomposition initiation system, such as thermal initiators. A degassing procedure may generally be used after the polymerization at the elevated temperature. These CRP materials may not be controlled or activated by light, in particularly, visible light. In addition, it may be desirable to record HOEs at room temperature, rather than recording at elevated temperatures where a subsequent degassing procedure may be needed.

According to certain embodiments, light-activated controlled radical polymerization (CRP) materials may be used for recording high performance HOEs that have, for example, high dynamic ranges, small feature sizes, high diffraction efficiencies, and high numbers of multiplexed holograms. The polymerization in the light-activated CRP materials may be turned on or off by light. In addition, the concentration of radicals may be low during the polymerization and may be deactivated once the exposure stops. Thus, the light-activated CRP material may be spatially and temporally controlled to undergo polymerization during exposure and may stop the polymerization immediately after the exposure. As such, the polymerization of monomers after exposure and the blurring effect may be minimized. Examples of the light-activated CRP materials may include ATRP materials with copper or other transition metal photocatalyst, metal-free ATRP materials with organic photocatalysts, photo-induced electron transfer RAFT (PET-RAFT), RAFT materials with metal catalysts or metal-free catalysts, and the like. The photocatalysts may include a photoredox catalyst, which may include a light-sensitive compound that, when excited by light, can mediate the transfer of electrons between chemical compounds in chemical processes of reduction and oxidation.

Figure 14:
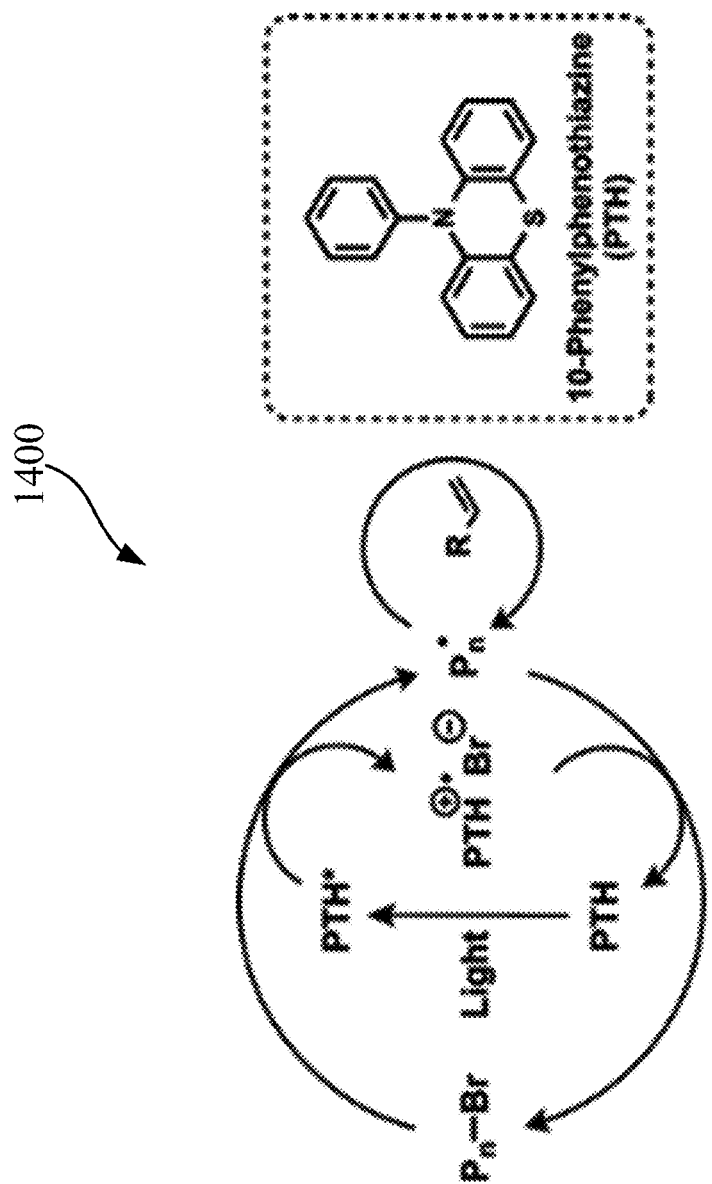
FIG. 14 illustrates an example of a scheme for a light-activated metal-free ATRP process for recording holographic optical elements according to certain embodiments.

FIG. 14 illustrates an example of a scheme 1400 for a light-activated metal-free ATRP process for recording holographic optical elements according to certain embodiments. Rather than using a transition metal complex and ligand as the catalyst as shown in FIGS. 11A-11C, a small molecule organic photoredox catalyst, such as 10-phenylphenothiazine (PTH) shown in FIG. 14, may be used for the controlled polymerization of monomers (e.g., methacrylates) according to:

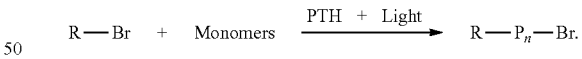

Photocatalysis by PTH may allow reversible activation with light where polymerization may only be possible upon irradiation and may be completely suppressed in the absence of light. Thus, photocatalysis by PTH enables precise control over molecular weight and molecular weight distributions of poly(methacrylates) with high chain-end-group fidelity, enabling the synthesis of well-defined block and random copolymers. For example, the dispersity (or polydispersity index) of the polymers generated by the photoactivated polymerization may be less than 2 or less than 1.5, or close to 1.0.

As illustrated in FIG. 14, the excitation of PTH with recording light (e.g., UV or visible light) at room temperature may activate the alkyl halide initiator and may generate a carbon-centered propagating radical $P_n^{\bullet}$ for subsequent monomer propagation, and a deactivating catalyst complex including a radical cation form of the photocatalyst PTH$^{+\cdot}$ and a bromine anion Br$^-$. The deactivating catalyst complex may subsequently deactivate growing polymer chains through formation of a dormant, bromine-end-capped species (P$_n$-Br) and reduction back to the initial state PTH, leading to a controlled chain propagation. After the photoexcitation stops, and deactivating catalyst complex may deactivate the growing polymer chains to yield an end-capped dormant state as in ATRP process described above. Thus, in light-activated metal-free ATRP, the polymerization may occur at room temperature without performing a subsequent degassing procedure. In contrast to ATRP using metal catalysts, the absence of metals and associated ligands may simplify the overall polymerization setup.

The metal-free organic photocatalysts may include various derivatives of, for example, phenothiazines, aromatic hydrocarbons, phenazines, phenoxazines, carbazoles, and thienothiophenes. These catalyst families may enable photoexcitation of electron transfer events that otherwise may not occur through thermal processes. Some examples of metal-free organic photocatalysts may include perylene, phenothiazines with naphthyl (Napht-PTH), benzo[b]-phenothiazine (benzoPTZ), 1,2,3,5-tetrakis(carbazol-9-yl)-4,6-dicyanobenzene (4CzIPN), 4-[2-(4-diphenylaminophenyl)thieno[3,2-b]thiophen3-yl]benzonitrile (TT-TPA), 3,7-di(2-naphthyl)-2-naphthalene-10-phenoxazine (Dinapht-PhenO), and the like.

Figure 15:
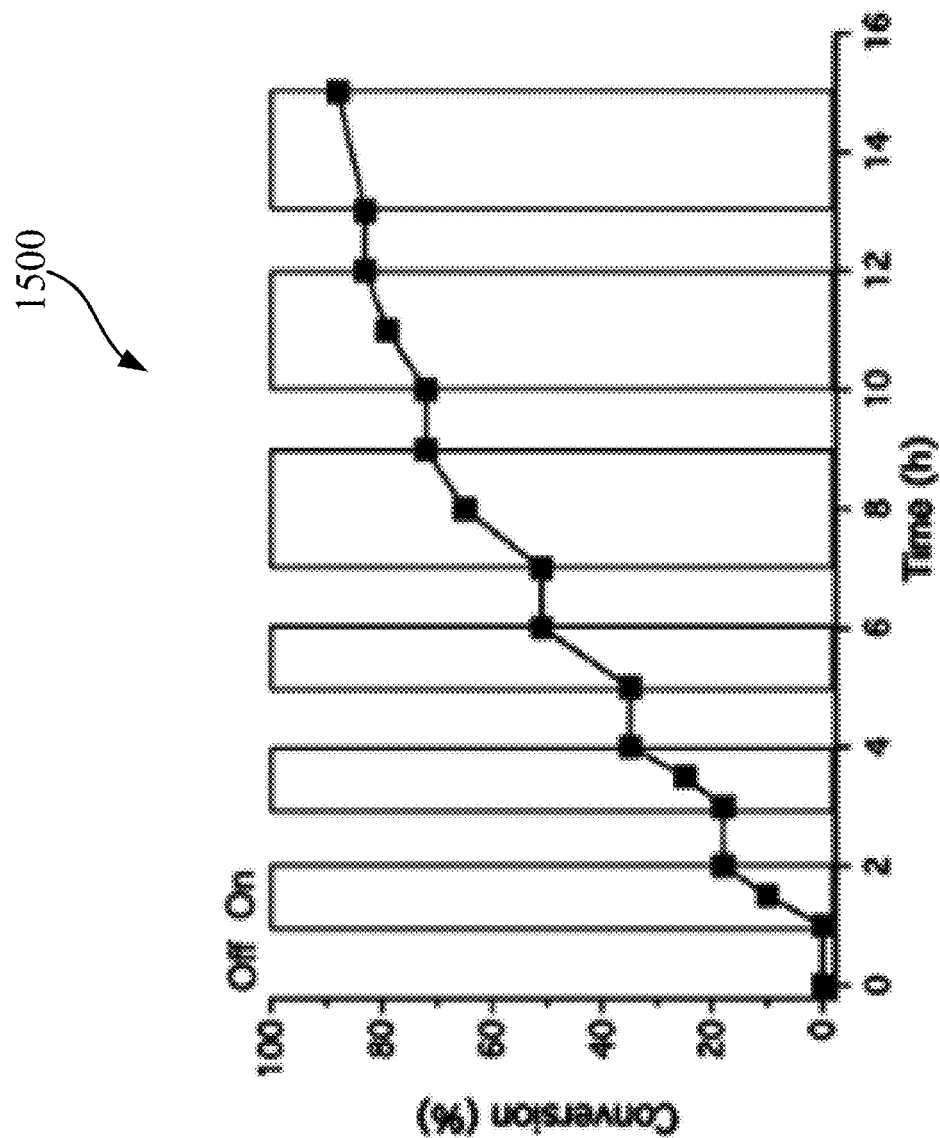
FIG. 15 illustrates examples of experimental results showing that the polymerization reaction can be controlled by light in a light-activated metal-free ATRP process according to certain embodiments.

FIG. 15 illustrates examples of experimental results showing that the polymerization reaction can be controlled by light in a light-activated metal-free ATRP process according to certain embodiments. As shown in the examples, the monomer conversion rate may increase monotonically with respect to the exposure time when the exposure light is turned on, and may remain constant when the exposure light is turned off. For example, FIG. 15 shows that no reaction is observed in one hour after removal of the exposure light. Re-exposure to the exposure light may led to further reactions. The light on/off cycle is repeated several times until a high conversion (e.g., about 90%) is achieved, indicating an efficient activation and deactivation of the polymerization process. In addition, a linear increase in conversion rate with exposure time may be obtained even with multiple light on/off cycles.

In photo-induced RAFT process, the polymerization may occur at room temperature without the degassing procedure. Moreover, the polymerization process may be controlled by switching exposure light on and off. Photo-controlled RAFT polymerization may include the homolysis of RAFT agents activated directly by light to generate radicals R (instead of generating radicals from added initiators); or the generation of radicals initiated by photoinitiators or photoredox catalysts through the photo-induced electron transfer-reversible addition-fragmentation chain transfer (PET-RAFT).

Figure 16:
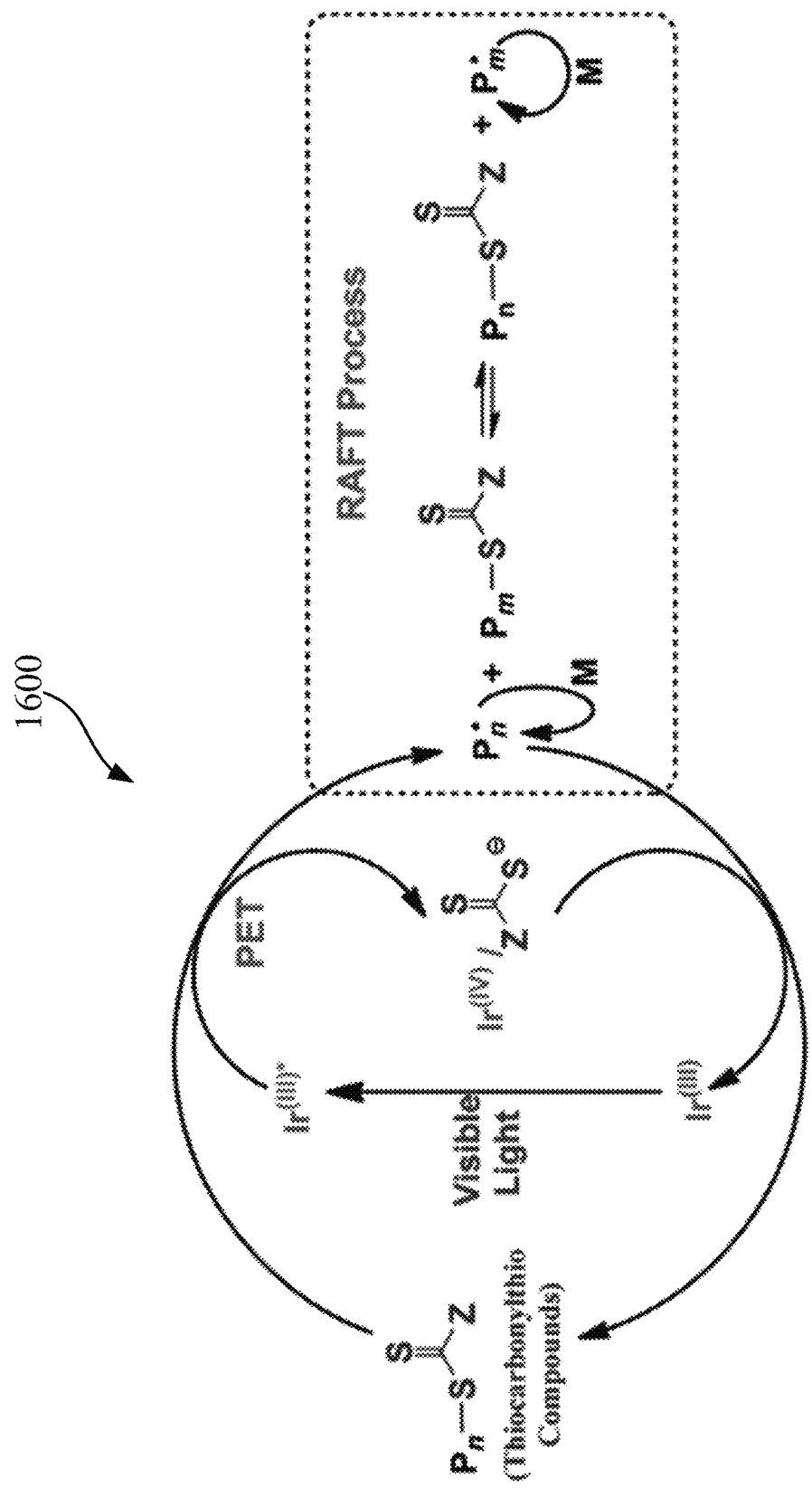
FIG. 16 illustrates an example of a scheme of photo-induced electron transfer RAFT (PET-RAFT) process for recording holographic optical elements according to certain embodiments.

FIG. 16 illustrates an example of a scheme 1600 of photo-induced electron transfer RAFT (PET-RAFT) process for recording holographic optical elements according to certain embodiments. In PET-RAFT, transition metal photocatalysts, such as fac-Ir(ppy)$_3$ or Ru(bpy)$_3$Cl$_2$, may be used to polymerize a broad range of conjugated (e.g., (meth)acrylate, (meth)acrylamide, and styrene), unconjugated (e.g., vinyl esters, N-vinyl pyrrolidinone, isoprene, and dimethyl vinyl phosphonate), metallocene (e.g., cationic cobaltocenium and neutral ferrocene) monomers, and the like, via direct activation of RAFT through a photo-induced electron- or energy-transfer process. For example, as shown by scheme 1600, upon light irradiation (e.g., blue light at about 460 nm), photocatalyst fac-Ir(ppy)$_3$ may enter its excited state, where it is used to reduce the RAFT agents (e.g., thiocarbonylthio compounds). Because the reduction potential of Ir$^{(IV)}$/Ir$^{(III)*}$ is much lower than the reduction potential of most trithiocarbonates, dithiobenzoates, and xanthates, Ir$^{(III)*}$ is able to reduce these RAFT agents through a PET process. The reduction of RAFT agents may lead to the production of radical (P$_n$$^{\cdot}$) and Ir$^{(IV)}$ species, with the generated radicals may react with monomers or may be deactivated by Ir$^{(IV)}$ to regenerate Ir$^{(III)}$. Thus, the presence of light may activate the radical propagation, whereas the absence of light may suppress the polymerization, resulting in temporal control throughout the polymerization process.

Figure 17:
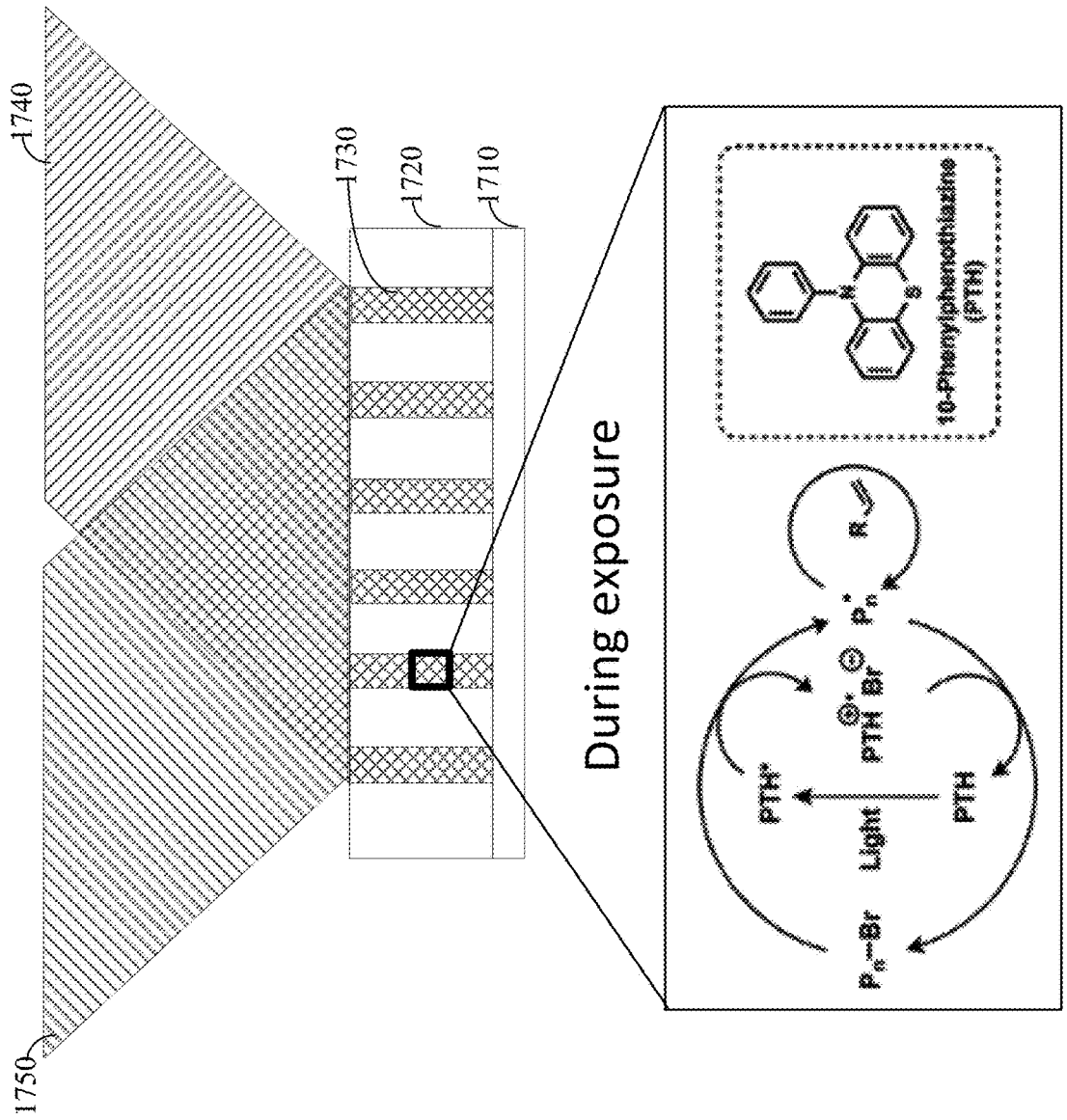
FIG. 17 illustrates an example of recording holographic optical elements using light-activated CRP according to certain embodiments.

FIG. 17 illustrates an example of recording holographic optical elements using light-activated CRP materials according to certain embodiments. As illustrated, a light-activated CRP material layer 1720 may be formed on a substrate 1710, where light-activated CRP material layer 1720 may include any of the light-activated CRP materials described above, such as ATRP materials with copper or other transition metal photocatalyst, metal-free ATRP materials with photocatalysts, photo-induced electron transfer RAFT (PET-RAFT), RAFT materials with metal catalysts or metal-free catalysts, and the like. In the example shown in FIG. 17, light-activated CRP material layer 1720 may include a small molecule organic photoredox catalyst, such as 10-phenylphenothiazine (PTH) shown in FIG. 14.

When light-activated CRP material layer 1720 is exposed to an interference light pattern generated by two coherent recording beams 1740 and 1750, the light in bright fringes 1730 may cause the photocatalysts to activate the alkyl halide initiator and generate a carbon-centered propagating radical P$_n$$^{\cdot}$ for subsequent monomer propagation, and a deactivating catalyst complex including a radical cation form of the photocatalyst PTH$^{+\cdot}$ and a bromine anion Br$^-$. The deactivating catalyst complex may subsequently deactivate growing polymer chains through formation of a dormant, bromine-end-capped species (P$_n$-Br) and reduction back to the initial state PTH. After the photoexcitation stops, the deactivating catalyst complex may deactivate the growing polymer chains to yield an end-capped dormant state as in ATRP process described above.

Thus, the radical concentration may stay low during polymerization and the chain transfer may be suppressed. In addition, the radicals may have a shorter lifetime to add monomers to the polymer chains, and may be mostly attached to the polymer matrix and less likely to diffuse into the dark fringes. After the exposure stops, no polymerization may take place, in contrast to traditional materials where polymerization continues after the exposure. Thus, complicated dose scheduling procedure can be avoided with a controlled polymerization. Because the blurring effect caused by the polymerization and diffusion after the exposure may be reduced or minimized, the maximum achievable refractive index modulation Δn may be used as efficiently as possible, leading to higher overall dynamic range than materials based on uncontrolled polymerization. In addition, the minimum feature size or pitch may also be reduced.

Figure 18:
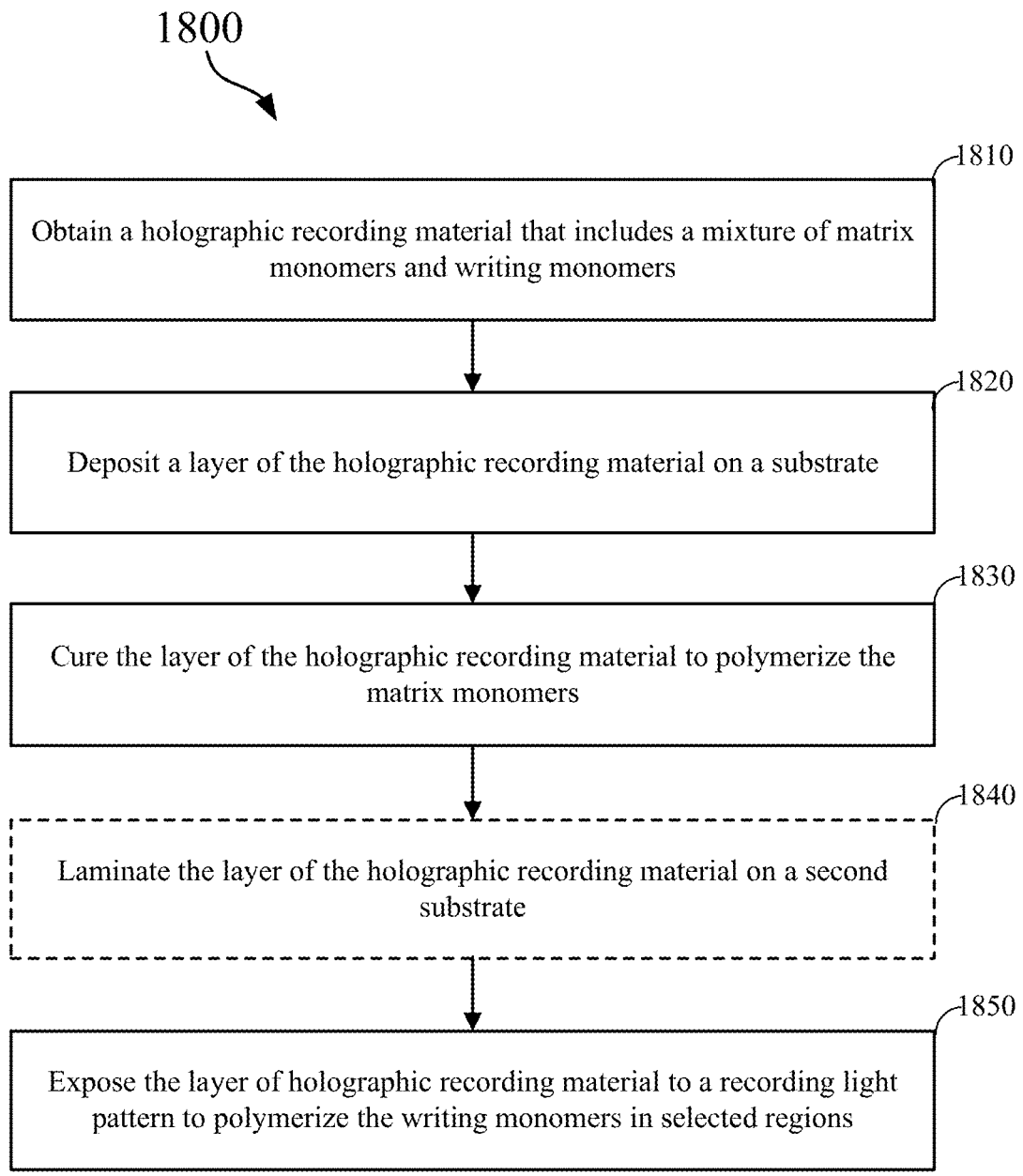
FIG. 18 is a simplified flow chart illustrating an example of a method of fabricating a holographic optical element according to certain embodiments.

FIG. 18 is a simplified flow chart 1800 illustrating an example of a method of fabricating a holographic optical element according to certain embodiments. The operations described in flow chart 1800 are for illustration purposes only and are not intended to be limiting. In various implementations, modifications may be made to flow chart 1800 to add additional operations, omit some operations, combine some operations, split some operations, or reorder some operations.

At block 1810, a holographic recording material may be obtained. The holographic recording material may include a mixture of matrix monomers and writing monomers. The matrix monomers may be configured to polymerize (e.g., via thermal treatment) to form a polymer matrix. The writing monomers may be dispersed in the matrix monomers and may be configured to polymerize when the holographic recording material is exposure to recording light. The matrix monomers and the writing monomers may have different refractive index. For example, the writing monomers may have a higher refractive index than the matrix monomers. The holographic recording material may also include some initiating agents, such as photosensitive dyes, initiators, catalysts (e.g., photocatalysts), chain transfer agents, RAFT agents, or the like, as described above.

At block 1820, a layer of the holographic recording material may be deposited on a substrate. For example, the holographic recording material may be deposited on the substrate by spin-coating. The substrate may include one or more types of dielectric materials, such as glass, quartz, plastic, polymer, poly(methyl methacrylate) (PMMA), crystal, or ceramic. For example, the substrate may include a plastic film. In some embodiments, the layer of the holographic recording material may be sandwiched by two substrates. For example, the layer of the holographic recording material may be covered by a flexible layer of polyester film or plastic sheet referred to as a mylar.

At block 1830, the layer of the holographic recording material may be cured, for example, thermally or optically, to polymerize the matrix monomers and form a polymer matrix. The writing monomers may not polymerize under the curing condition and may be dispersed in the formed polymer matrix. The initiating agents may also be dispersed in the formed polymer matrix. The polymer matrix may function as a support matrix or backbone of the layer of the holographic recording material.

Optionally, at block 1840, the layer of the holographic recording material may be laminated on a second substrate. For example, one of the two substrates that sandwich the layer of the holographic recording material, such as the flexible layer of polyester film or plastic sheet, may be peeled off, and the layer of the holographic recording material on one substrate may then be laminated on another substrate, such as an optical component (e.g., a quartz, glass, or crystal plate or lens).

At block 1850, the layer of holographic recording material may be exposed to a recording light pattern to polymerize the writing monomers in selected regions, such as the bright fringes of the recording light pattern, as described above with respect to, for example, FIGS. 7A-8. The recording light pattern may correspond to a grating, a lens, a diffuser, and the like. The recording light pattern may cause the polymerization and diffusion of the writing monomers to form a holographic optical element corresponding to the recording light pattern as described above.

Embodiments of the invention may be used to fabricate components of an artificial reality system or may be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 19:
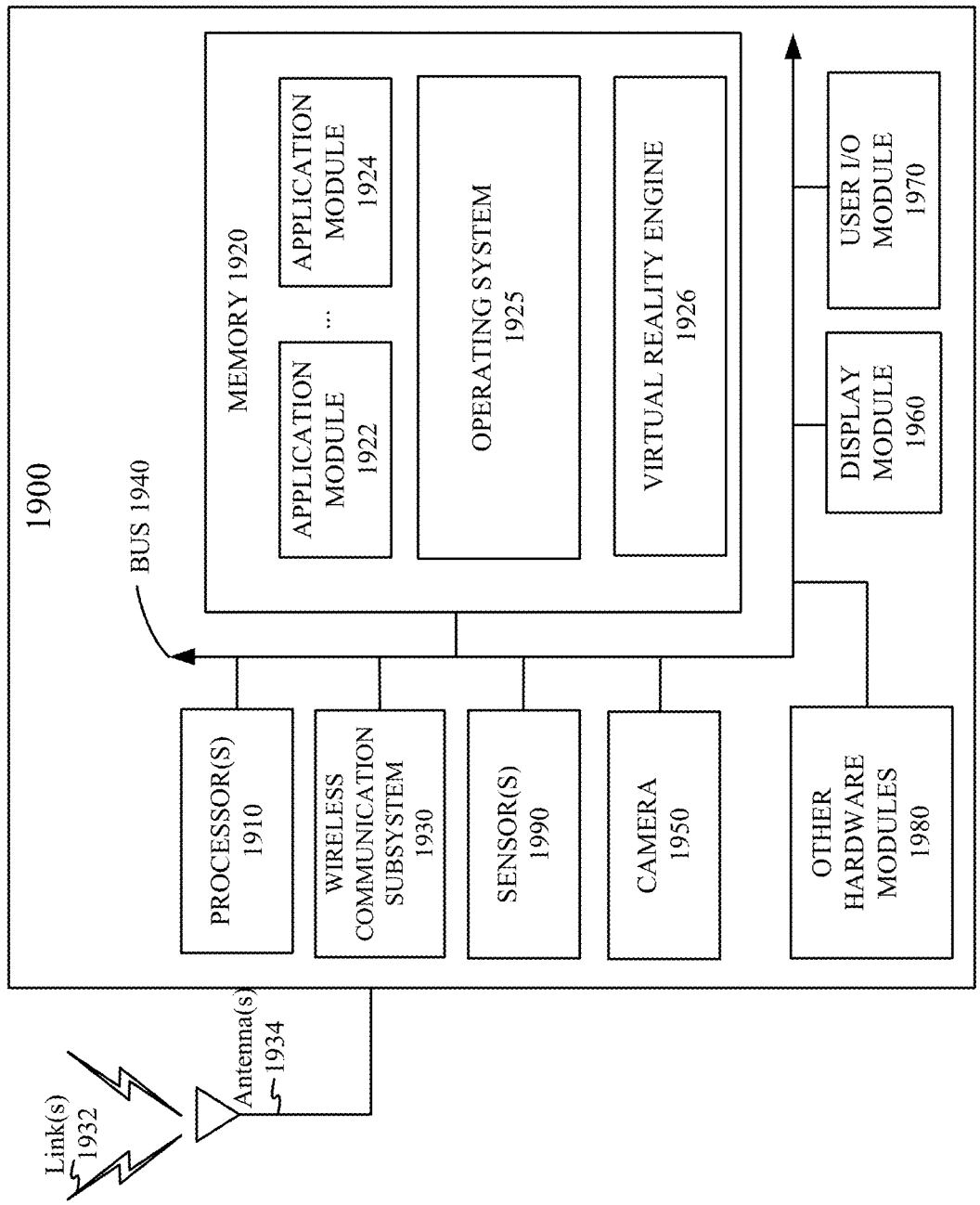
FIG. 19 is a simplified block diagram of an example of an electronic system of a near-eye display system (e.g., HMD device) for implementing some of the examples disclosed herein according to certain embodiments.

FIG. 19 is a simplified block diagram of an example of an electronic system 1900 of a near-eye display system (e.g., HMD device) for implementing some of the examples disclosed herein. Electronic system 1900 may be used as the electronic system of an HMD device or other near-eye displays described above. In this example, electronic system 1900 may include one or more processor(s) 1910 and a memory 1920. Processor(s) 1910 may be configured to execute instructions for performing operations at a number of components, and can be, for example, a general-purpose processor or microprocessor suitable for implementation within a portable electronic device. Processor(s) 1910 may be communicatively coupled with a plurality of components within electronic system 1900. To realize this communicative coupling, processor(s) 1910 may communicate with the other illustrated components across a bus 1940. Bus 1940 may be any subsystem adapted to transfer data within electronic system 1900. Bus 1940 may include a plurality of computer buses and additional circuitry to transfer data.

Memory 1920 may be coupled to processor(s) 1910. In some embodiments, memory 1920 may offer both short-term and long-term storage and may be divided into several units. Memory 1920 may be volatile, such as static random access memory (SRAM) and/or dynamic random access memory (DRAM) and/or non-volatile, such as read-only memory (ROM), flash memory, and the like. Furthermore, memory 1920 may include removable storage devices, such as secure digital (SD) cards. Memory 1920 may provide storage of computer-readable instructions, data structures, program modules, and other data for electronic system 1900. In some embodiments, memory 1920 may be distributed into different hardware modules. A set of instructions and/or code might be stored on memory 1920. The instructions might take the form of executable code that may be executable by electronic system 1900, and/or might take the form of source and/or installable code, which, upon compilation and/or installation on electronic system 1900 (e.g., using any of a variety of generally available compilers, installation programs, compression/decompression utilities, etc.), may take the form of executable code.

In some embodiments, memory 1920 may store a plurality of application modules 1922 through 1924, which may include any number of applications. Examples of applications may include gaming applications, conferencing applications, video playback applications, or other suitable applications. The applications may include a depth sensing function or eye tracking function. Application modules 1922-1924 may include particular instructions to be executed by processor(s) 1910. In some embodiments, certain applications or parts of application modules 1922-1924 may be executable by other hardware modules 1980. In certain embodiments, memory 1920 may additionally include secure memory, which may include additional security controls to prevent copying or other unauthorized access to secure information.

In some embodiments, memory 1920 may include an operating system 1925 loaded therein. Operating system 1925 may be operable to initiate the execution of the instructions provided by application modules 1922-1924 and/or manage other hardware modules 1980 as well as interfaces with a wireless communication subsystem 1930 which may include one or more wireless transceivers. Operating system 1925 may be adapted to perform other operations across the components of electronic system 1900 including threading, resource management, data storage control and other similar functionality.

Wireless communication subsystem 1930 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 1900 may include one or more antennas 1934 for wireless communication as part of wireless communication subsystem 1930 or as a separate component coupled to any portion of the system. Depending on desired functionality, wireless communication subsystem 1930 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.1x network. A WPAN may be, for example, a Bluetooth network, an IEEE 802.15x, or some other types of network. The techniques described herein may also be used for any combination of WWAN, WLAN, and/or WPAN. Wireless communications subsystem 1930 may permit data to be exchanged with a network, other computer systems, and/or any other devices described herein. Wireless communication subsystem 1930 may include a means for transmitting or receiving data, such as identifiers of HMD devices, position data, a geographic map, a heat map, photos, or videos, using antenna(s) 1934 and wireless link(s) 1932. Wireless communication subsystem 1930, processor(s) 1910, and memory 1920 may together comprise at least a part of one or more of a means for performing some functions disclosed herein.

Embodiments of electronic system 1900 may also include one or more sensors 1990. Sensor(s) 1990 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 1990 may include one or more inertial measurement units (IMUs) and/or one or more position sensors. An IMU may generate calibration data indicating an estimated position of the HMD device relative to an initial position of the HMI device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 1900 may include a display module 1960. Display module 1960 may be a near-eye display, and may graphically present information, such as images, videos, and various instructions, from electronic system 1900 to a user. Such information may be derived from one or more application modules 1922-1924, virtual reality engine 1926, one or more other hardware modules 1980, a combination thereof, or any other suitable means for resolving graphical content for the user (e.g., by operating system 1925). Display module 1960 may use liquid crystal display (LCD) technology, light-emitting diode (LED) technology (including, for example, OLED, ILED, pLED, AMOLED, TOLED, etc.), light emitting polymer display (LPD) technology, or some other display technology.

Electronic system 1900 may include a user input/output module 1970. User input/output module 1970 may allow a user to send action requests to electronic system 1900. An action request may be a request to perform a particular action. For example, an action request may be to start or end an application or to perform a particular action within the application. User input/output module 1970 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 1900. In some embodiments, user input/output module 1970 may provide haptic feedback to the user in accordance with instructions received from electronic system 1900. For example, the haptic feedback may be provided when an action request is received or has been performed.

Electronic system 1900 may include a camera 1950 that may be used to take photos or videos of a user, for example, for tracking the user's eye position. Camera 1950 may also be used to take photos or videos of the environment, for example, for VR, AR, or MR applications. Camera 1950 may include, for example, a complementary metal-oxide-semiconductor (CMOS) image sensor with a few millions or tens of millions of pixels. In some implementations, camera 1950 may include two or more cameras that may be used to capture 3-D images.

In some embodiments, electronic system 1900 may include a plurality of other hardware modules 1980. Each of other hardware modules 1980 may be a physical module within electronic system 1900. While each of other hardware modules 1980 may be permanently configured as a structure, some of other hardware modules 1980 may be temporarily configured to perform specific functions or temporarily activated. Examples of other hardware modules 1980 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 1980 may be implemented in software.

In some embodiments, memory 1920 of electronic system 1900 may also store a virtual reality engine 1926. Virtual reality engine 1926 may execute applications within electronic system 1900 and receive position information, acceleration information, velocity information, predicted future positions, or some combination thereof of the HMD device from the various sensors. In some embodiments, the information received by virtual reality engine 1926 may be used for producing a signal (e.g., display instructions) to display module 1960. For example, if the received information indicates that the user has looked to the left, virtual reality engine 1926 may generate content for the HMD device that mirrors the user's movement in a virtual environment. Additionally, virtual reality engine 1926 may perform an action within an application in response to an action request received from user input/output module 1970 and provide feedback to the user. The provided feedback may be visual, audible, or haptic feedback. In some implementations, processor(s) 1910 may include one or more GPUs that may execute virtual reality engine 1926.

In various implementations, the above-described hardware and modules may be implemented on a single device or on multiple devices that can communicate with one another using wired or wireless connections. For example, in some implementations, some components or modules, such as GPUs, virtual reality engine 1926, and applications (e.g., tracking application), may be implemented on a console separate from the head-mounted display device. In some implementations, one console may be connected to or support more than one HMD.

In alternative configurations, different and/or additional components may be included in electronic system 1900. Similarly, functionality of one or more of the components can be distributed among the components in a manner different from the manner described above. For example, in some embodiments, electronic system 1900 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. An optical recording film for holographic recording comprising:
a first substrate;
a second substrate;
a polymer matrix between the first substrate and the second substrate and characterized by a first refractive index;
monomers dispersed in the polymer matrix and characterized by a second refractive index different from the first refractive index, the monomers configured to polymerize in regions of the optical recording film exposed to recording light;
an initiator including an alkyl halide dispersed in the polymer matrix;
a photoredox catalyst for controlled radical polymerization of the monomers during exposure to the recording light, the photoredox catalyst dispersed in the polymer matrix and including a metal-free organic photocatalyst, wherein the photoredox catalyst is sensitive to visible light and is reversible, and wherein an amount of the photoredox catalyst is selected such that the photoredox catalyst is configured to, upon exposure to the visible light in selected regions of the optical recording film,
generate, from the alkyl halide and in the selected regions of the optical recording film, an alkyl radical for initiating polymerization of the monomers; and
generate, from the photoredox catalyst and the alkyl halide and in the selected regions of the optical recording film, a sufficient amount of deactivating catalyst complex for suppressing the polymerization of the monomers in the selected regions of the optical recording film during and after the exposure to the visible light, such that a polydispersity index of polymers formed by the polymerization of the monomers in the selected regions of the optical recording film is controlled by the photoredox catalyst, wherein the deactivating catalyst complex includes a radical cation of the photoredox catalyst and a halide anion and is configured to, during and after the exposure of the selected regions of the optical recording film to the visible light, reduce the radical cation of the photoredox catalyst in the selected regions back to the photoredox catalyst and deactivate carbon-centered propagating radicals in the selected regions using the halide anion to form halogen end-capped polymer chains and suppress the polymerization; and
a deactivator before the exposure to the recording light, wherein the deactivator includes the deactivating catalyst complex and is characterized by a concentration about 10% of a concentration of the photoredox catalyst before the exposure to the recording light.

2. The optical recording film of claim 1, wherein the monomers include acrylates, acrylamides, acrylonitrile, styrenes, dienes, or vinyl monomers.

3. The optical recording film of claim 1, wherein the photoredox catalyst includes a derivative of phenothiazine, phenazine, phenoxazine, carbazole, thienothiophene, or perylene.

4. The optical recording film of claim 3, wherein the photoredox catalyst includes 10-phenylphenothiazine.

5. The optical recording film of claim 1, wherein the polymer matrix includes polyurethane.

6. The optical recording film of claim 1, wherein the deactivating catalyst complex includes a radical cation of 10-phenylphenothiazine and a bromine anion $Br^-$.

7. The optical recording film of claim 1, wherein the polydispersity index of the polymers formed by the polymerization of the monomers in the selected regions of the optical recording film is less than 2.

8. The optical recording film of claim 1, wherein the deactivator includes $PTH^{+\cdot}Br^-$, where PTH is 10-phenylphenothiazine.

9. A holographic optical element comprising:
a polymer matrix including a first polymer material characterized by a first refractive index;
a second polymer material supported by the polymer matrix and characterized by a second refractive index different from the first refractive index, the second polymer material distributed in the polymer matrix according to a non-uniform pattern and including halogen end-capped polymer chains in selected regions;
an initiator including an alkyl halide dispersed in the polymer matrix;
a photoredox catalyst for controlled radical polymerization during exposure to recording light, the photoredox catalyst dispersed in the polymer matrix and including a metal-free organic photocatalyst, wherein the photoredox catalyst is sensitive to visible light and is reversible, wherein the photoredox catalyst includes a derivative of phenothiazine, phenazine, phenoxazine, carbazole, thienothiophene, or perylene, and wherein an amount of the photoredox catalyst is selected such that the photoredox catalyst is configured to, upon exposure to the visible light in the selected regions at room temperature,
- generate, from the alkyl halide and in the selected regions, an alkyl radical for initiating polymerization of monomers in the selected regions to form the second polymer material; and
- generate, from the photoredox catalyst and the alkyl halide and in the selected regions, a sufficient amount of deactivating catalyst complex for suppressing the polymerization of the monomers in the selected regions during and after the exposure to the visible light to control a dispersity of the second polymer material in the selected regions, wherein the deactivating catalyst complex includes a radical cation of the photoredox catalyst and a halide anion and is configured to, during and after the exposure of the selected regions to the visible light, reduce the radical cation of the photoredox catalyst in the selected regions back to the photoredox catalyst and deactivate carbon-centered propagating radicals in the selected regions using the halide anion to form halogen end-capped polymer chains and suppress the polymerization; and a deactivator before the exposure to the recording light, wherein the deactivator includes the deactivating catalyst complex and is characterized by a concentration about 10% of a concentration of the photoredox catalyst before the exposure to the recording light.

10. The holographic optical element of claim 9, wherein the second polymer material includes an organic halide.

11. The holographic optical element of claim 9, wherein the dispersity of the second polymer material is less than 2.

12. The holographic optical element of claim 9, wherein the second polymer material distributed in the polymer matrix according to the non-uniform pattern forms a hologram, a holographic Bragg grating, a multiplexed holographic grating, a holographic lens, or a holographic diffuser.

13. An optical recording material comprising:
- matrix monomers characterized by a first refractive index and configured to polymerize to form a polymer matrix;
- writing monomers dispersed in the matrix monomers and characterized by a second refractive index different from the first refractive index, the writing monomers configured to polymerize upon exposed to recording light;
- an initiator including an alkyl halide dispersed in the polymer matrix;
- a photoredox catalyst for controlled radical polymerization of the writing monomers during exposure to the recording light, the photoredox catalyst dispersed in the matrix monomers and including a derivative of phenothiazine, wherein the photoredox catalyst is sensitive to the recording light and is reversible, wherein the photoredox catalyst includes 10-phenylphenothiazine, and wherein an amount of the photoredox catalyst is selected such that the photoredox catalyst is configured to, upon exposure to the recording light in selected regions,
  - generate, from the alkyl halide and in the selected regions, an alkyl radical for initiating the controlled radical polymerization of the writing monomers; and
  - generate, from the photoredox catalyst and the alkyl halide and in the selected regions of the optical recording material, a sufficient amount of deactivating catalyst complex for suppressing the controlled radical polymerization of the writing monomers in the selected regions during and after the exposure to the recording light, such that a polydispersity index of polymers formed by the controlled radical polymerization of the writing monomers in the selected regions is controlled by the photoredox catalyst, wherein the deactivating catalyst complex includes a radical cation of the photoredox catalyst and a halide anion and is configured to, during and after the exposure of the selected regions to the recording light, reduce the radical cation of the photoredox catalyst in the selected regions back to the photoredox catalyst and deactivate carbon-centered propagating radicals in the selected regions using the halide anion to form halogen end-capped polymer chains and suppress the polymerization; and
- a deactivator before the exposure to the recording light, wherein the deactivator includes the deactivating catalyst complex and is characterized by a concentration about 10% of a concentration of the photoredox catalyst before the exposure to the recording light.

14. The optical recording material of claim 13, wherein the deactivator includes $PTH^+ \cdot Br^+$, where PTH is 10-phenylphenothiazine.

* * * * *